United States Patent
Lee et al.

(10) Patent No.: US 11,013,002 B2
(45) Date of Patent: May 18, 2021

(54) MULTI-TECHNOLOGY AGGREGATION ARCHITECTURE FOR LONG TERM EVOLUTION COMMUNICATIONS SYSTEMS

(71) Applicant: AltioStar Networks, Inc., Tewksbury, MA (US)

(72) Inventors: Jung Ah Lee, Pittstown, NJ (US); Si Nguyen, Winchester, MA (US); Shabbir A. Bagasrawala, Lexington, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 17 days.

(21) Appl. No.: 15/889,508

(22) Filed: Feb. 6, 2018

(65) Prior Publication Data

US 2018/0227919 A1    Aug. 9, 2018

Related U.S. Application Data

(60) Provisional application No. 62/455,327, filed on Feb. 6, 2017.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0032* (2013.01); *H04W 72/0413* (2013.01);
(Continued)

(58) Field of Classification Search
CPC ......... H04W 72/0453; H04W 72/0413; H04W 84/04; H04W 72/1215; H04W 80/08; H04L 5/0032
See application file for complete search history.

(56) References Cited

U.S. PATENT DOCUMENTS

2011/0217921 A1    9/2011   Larsson et al.
2013/0028117 A1    1/2013   Montojo et al.
(Continued)

FOREIGN PATENT DOCUMENTS

WO    2013084058 A1    6/2013
WO    2014076004 A2    5/2014
(Continued)

OTHER PUBLICATIONS

NPL Publication R1-164020, "Coexistence of LTE and NR", Samsung, May 2016.*
(Continued)

*Primary Examiner* — Jackie Zuniga Abad
(74) *Attorney, Agent, or Firm* — Mintz Levin Cohn Ferris Glovsky and Popeo, P.C.

(57) ABSTRACT

A method, system, and computer program product for transmission of data in a wireless communications system. A first downlink data is transmitted to a user equipment using a first downlink frequency. A first uplink data is received from the user equipment utilizing a first uplink frequency. A second downlink data is transmitted to the user equipment using a second downlink frequency. A second uplink data is received using the first uplink frequency.

21 Claims, 24 Drawing Sheets

(51) Int. Cl.
   *H04W 72/12* (2009.01)
   *H04W 80/08* (2009.01)
   *H04W 84/04* (2009.01)

(52) U.S. Cl.
   CPC ........ *H04W 72/1215* (2013.01); *H04W 80/08* (2013.01); *H04W 84/04* (2013.01)

(56) References Cited

U.S. PATENT DOCUMENTS

| | | |
|---|---|---|
| 2014/0226481 A1 | 8/2014 | Dahod et al. |
| 2015/0296390 A1 | 10/2015 | Mino Diaz et al. |
| 2019/0141696 A1* | 5/2019 | Kim .................... H04L 5/0048 |

FOREIGN PATENT DOCUMENTS

| | | |
|---|---|---|
| WO | 2015115776 A1 | 8/2015 |
| WO | 2016115545 A2 | 7/2016 |

OTHER PUBLICATIONS

International Search Report and Written Opinion corresponding to International Patent Application No. PCT/US2018/16988, dated Aug. 1, 2018, 15 pages.

International Search Report and Written Opinion corresponding to International Patent Application No. PCT/US2018/16989, dated May 15, 2018, 12 pages.

* cited by examiner

MULTI-TECHNOLOGY AGGREGATION ARCHITECTURE FOR LONG TERM EVOLUTION COMMUNICATIONS SYSTEMS

CROSS-REFERENCE TO RELATED APPLICATIONS

The present application claims priority to U.S. Provisional Patent Appl. No. 62/455,327 to Lee, filed Feb. 6, 2017, and entitled "Multi-Technology Aggregation Architecture For Long Term Evolution Communications Systems", and incorporates its disclosure herein by reference in its entirety.

TECHNICAL FIELD

In some implementations, the current subject matter relates to telecommunications systems, and in particular, to multi-technology aggregation architecture for wireless communications systems, which can include a long term evolution system and 5G New Radio ("NR") communications system.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Different types of data can require different transmission bandwidth. For example, in order to reproduce a high-definition video on a mobile device having a good quality, a higher bandwidth may be required as compared to transmission of an email or a text message to the mobile device.

SUMMARY

In some implementations, the current subject matter relates to a computer-implemented method. The method can include transmitting a first downlink data to a user equipment using a first downlink frequency, receiving a first uplink data from the user equipment utilizing a first uplink frequency, transmitting a second downlink data to the user equipment using a second downlink frequency, and receiving a second uplink data using the first uplink frequency.

In some implementations, the current subject matter can include one or more of the following optional features. The first downlink data can be transmitted using the first base station in a wireless communication system and the first uplink data can be received using the first base station. Similarly, the second downlink data can be transmitted from the second base station in the wireless communication system and the second uplink data can be transmitted from the second base station to the first base station.

In some implementations, the first and second base stations can include at least one of the following: an eNodeB base station, a gNodeB base station, and any combination thereof. At least one of the first base station and the second base station can include at least one of the following: a radio transmitter, a radio receiver, and any combination thereof. The first and second base stations can be base stations operating in at least one of the following communications systems: a long term evolution communications system and a new radio communications system.

In some implementations, at least one of the first and second base stations can be communicatively coupled to at least one centralized unit configured to provide at least Packet Data Convergence Protocol control information to at least one of the first base station and the second base station. At least one of the first and second uplink data can include user control information.

In some implementations, the method can include generating, using the centralized unit, a Packet Data Convergence Protocol packet data unit based on the information provided by at least one of the first and second base stations, and transmitting the generated packet data unit to at least one of the first and second base stations. The method can also include independently generating scheduling information by the first and second base stations, and sharing the generated scheduling information among the first and second base stations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in multi-technology aggregation wireless communications systems. Such systems can include long term evolution wireless communications systems and/or New Radio communications systems. One or more aspects of the current subject matter can be incorporated into transmitter and/or receiver components of base stations in such communications systems. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
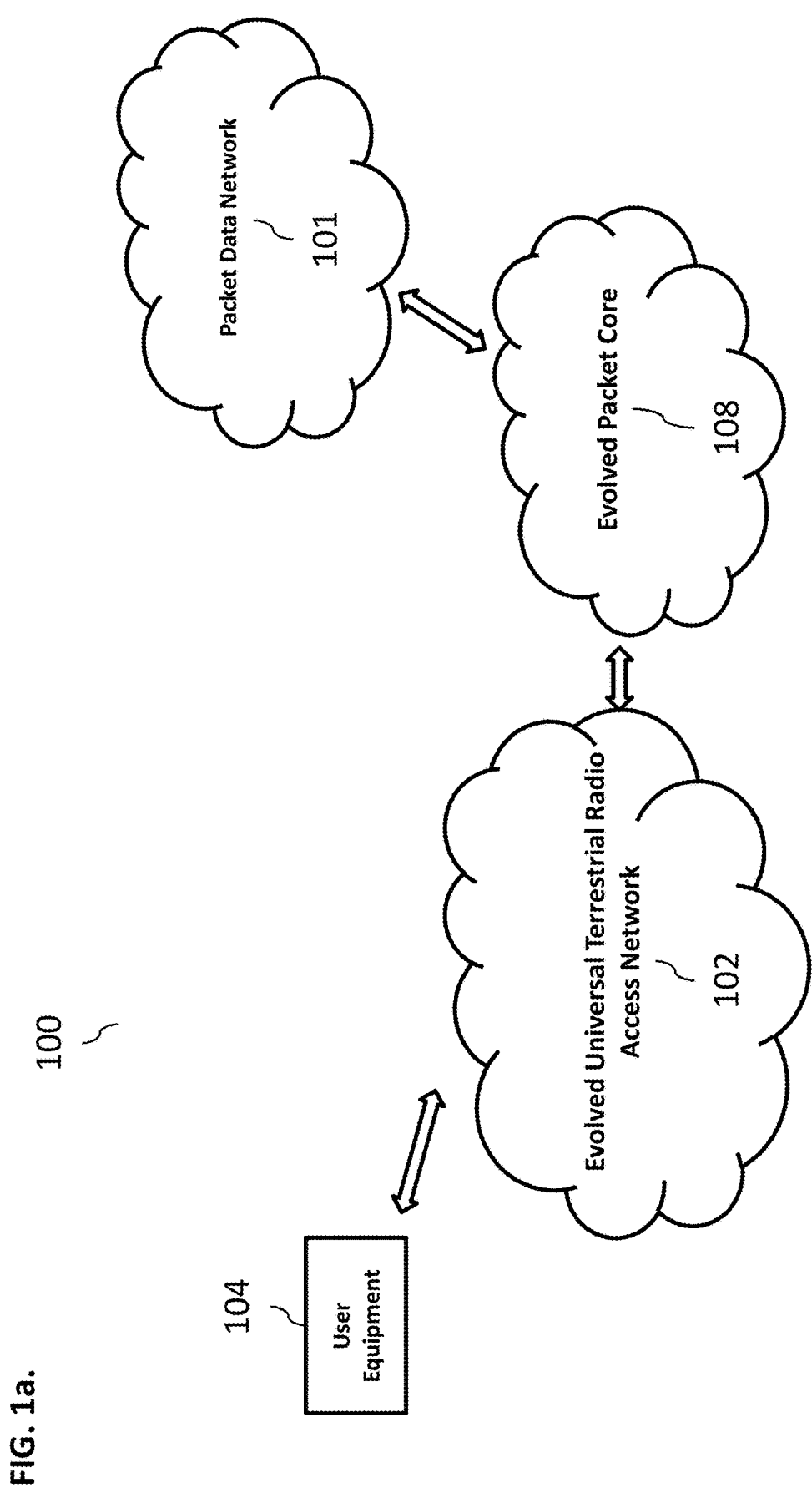
FIG. 1a illustrates an exemplary conventional long term evolution ("LTE") communications system.
Figure 1B:
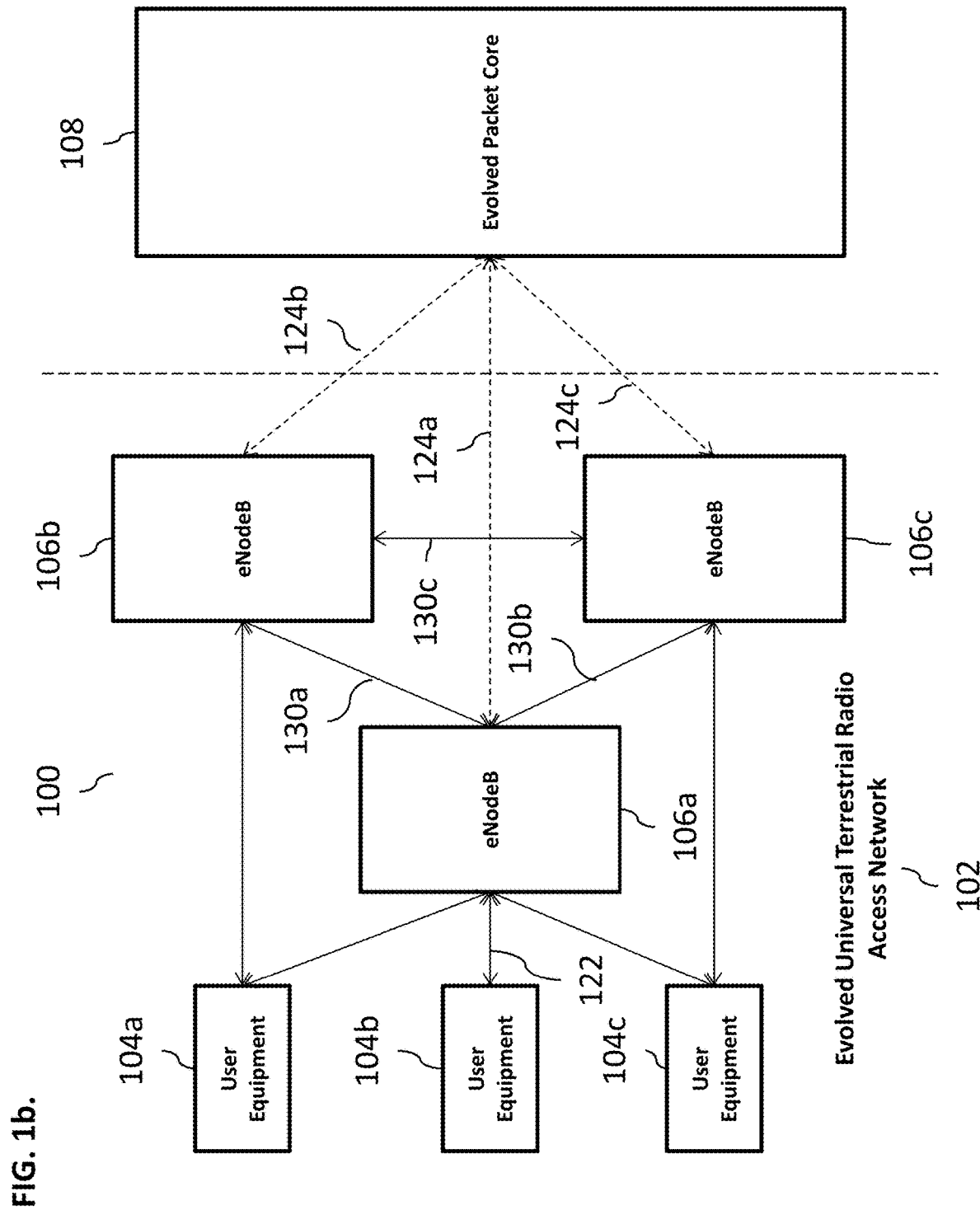

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (*a, b, c*) (as shown in FIG. 1*b*) that provide communication capabilities to a plurality of user equipment 104(*a, b, c*). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
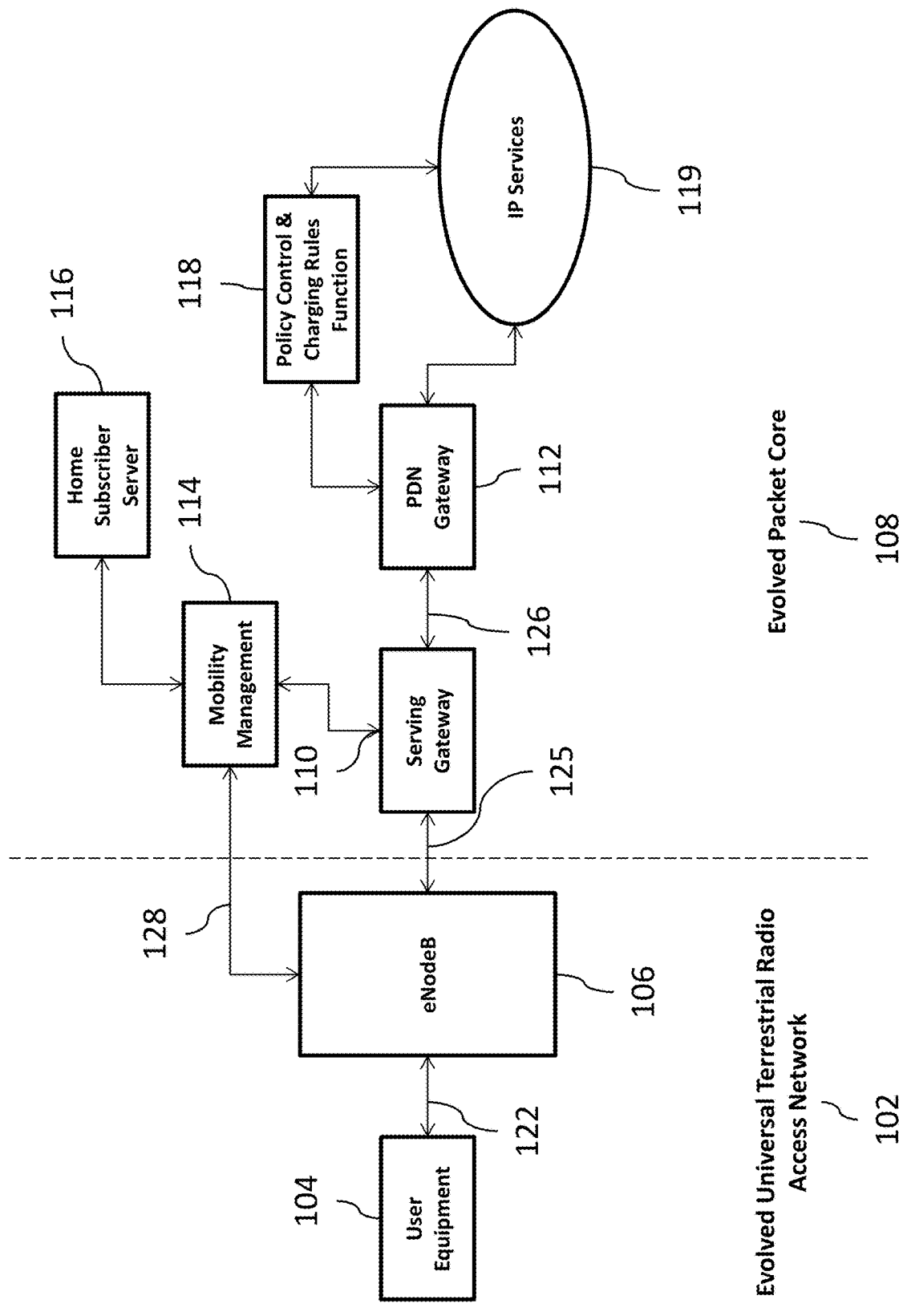

FIG. 1*b* illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1*b*, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(*a, b, c*). As shown in FIG. 1*a*, X2 interface 130*a* provides interconnection between eNodeB 106*a* and eNodeB 106*b*; X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124(*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
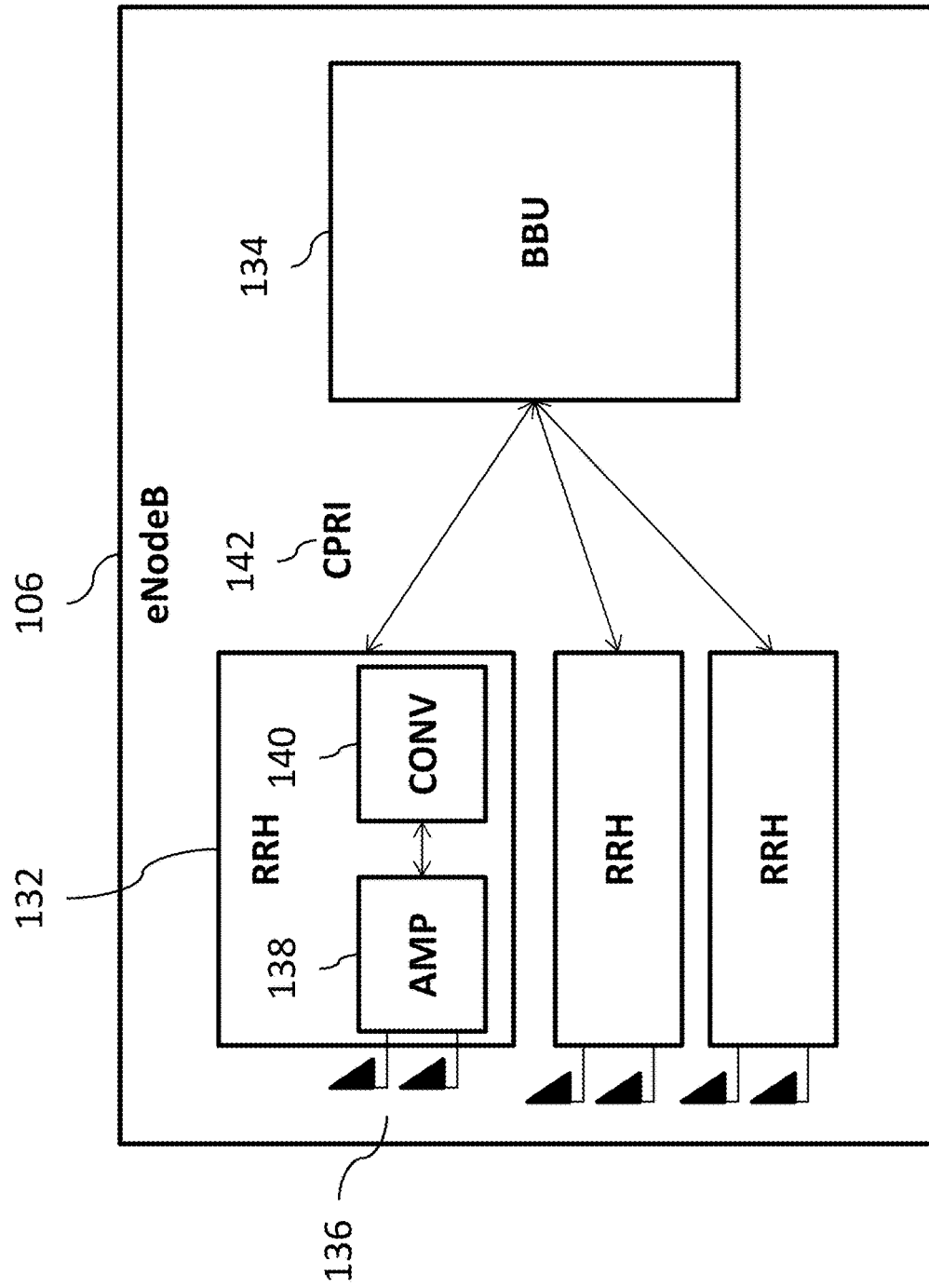

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
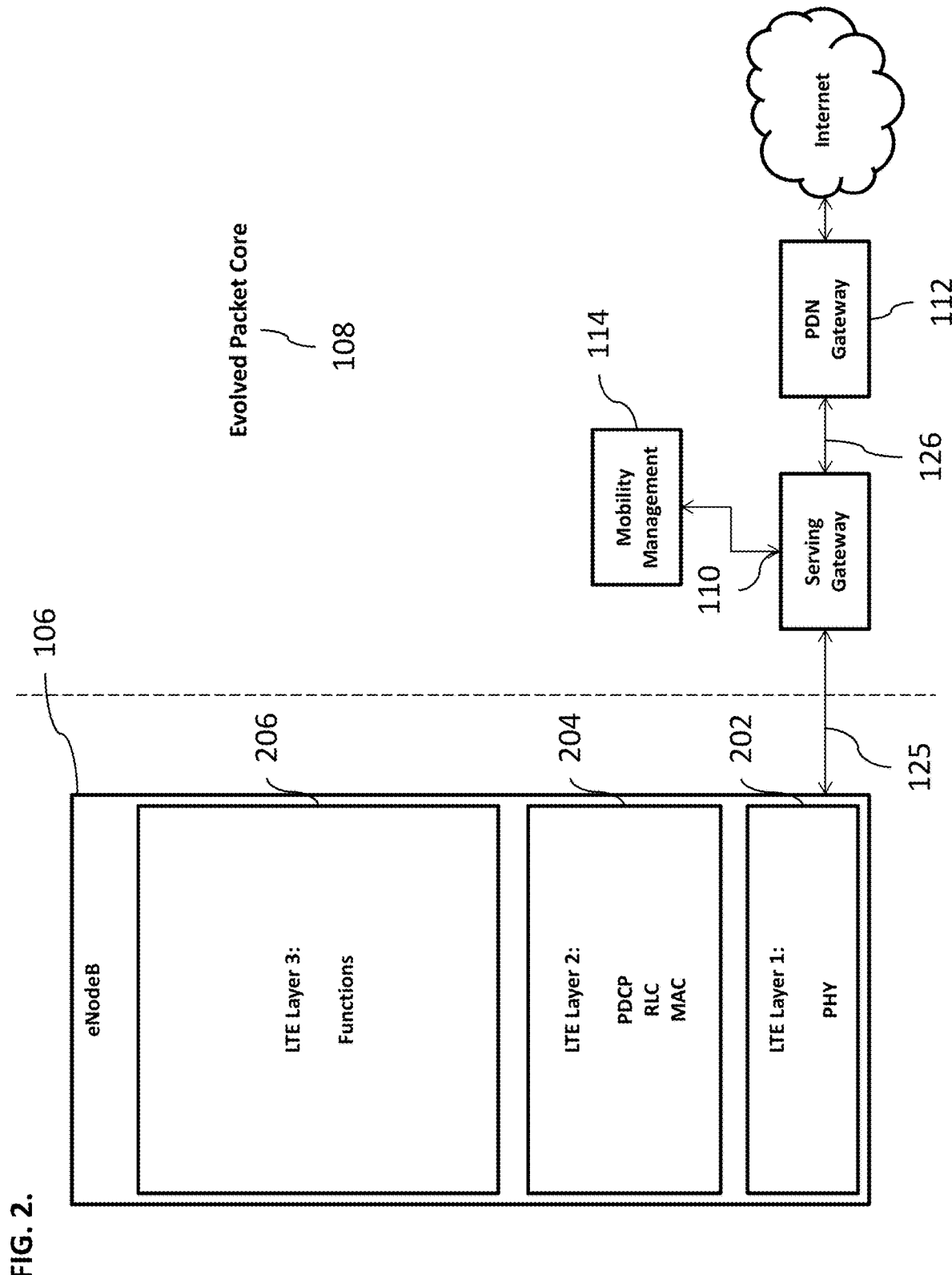
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
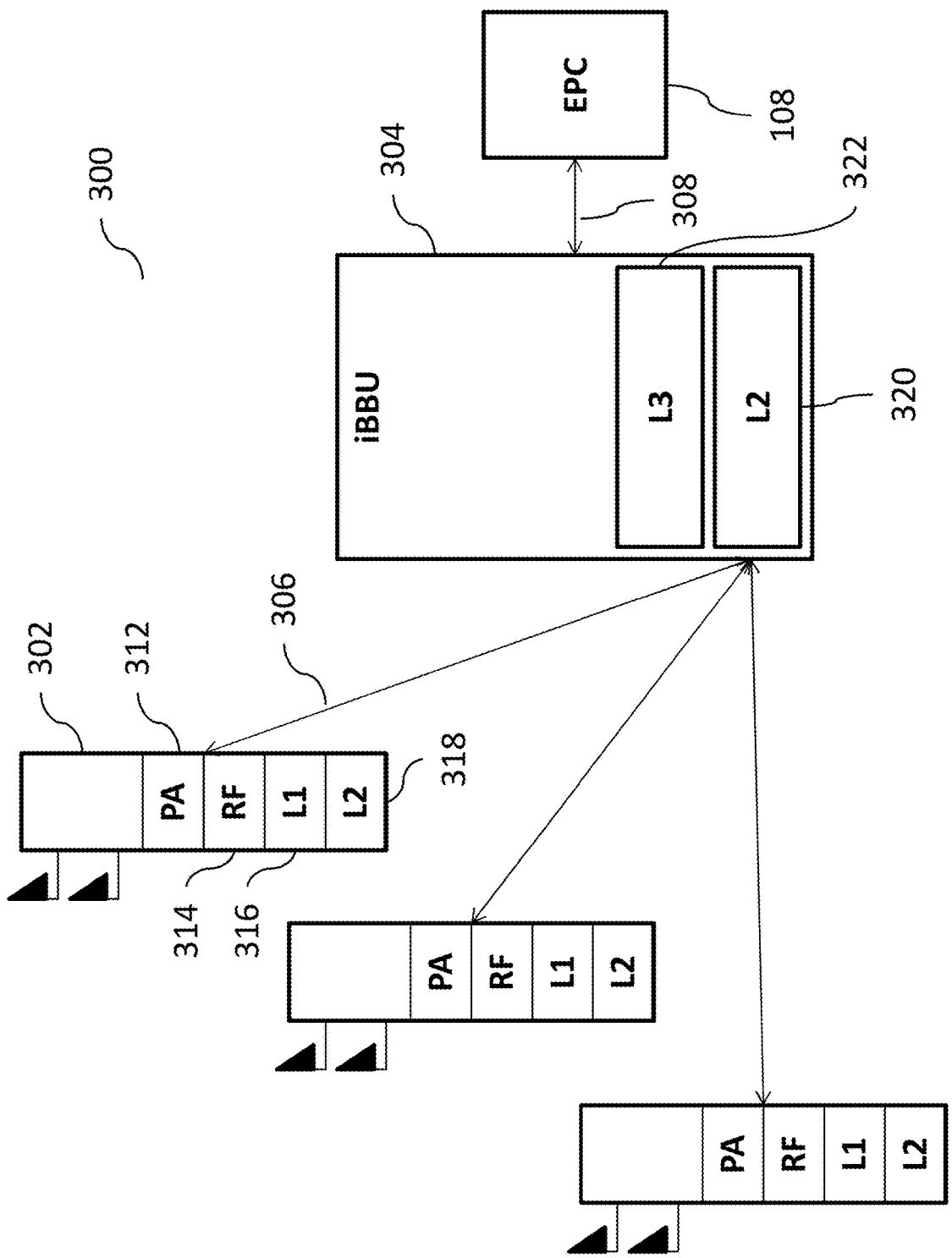
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN") or a virtual radio access network ("V-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

The system (e.g., LTE communications) 300 can implement carrier aggregation ("CA") and coordinated multipoint ("CoMP") transmission features. The CA and CoMP features have been discussed in the 3GPP standards for 4G LTE-Advanced, Releases 10 and 11, respectively. Both features are designed to increase data throughput rate and designed to work with 4G LTE-Advanced. The following is a brief summary of each of these features.

A. Carrier Aggregation

The CA or channel aggregation enables multiple LTE carriers to be used together to provide high data rates that are required for 4G LTE-Advanced. These channels or carriers can be in contiguous elements of the spectrum, or they may be in different bands. The carriers can be aggregated using contiguous intra-band carrier aggregation, non-contiguous intra-band carrier aggregation, and inter-band non-contiguous carrier aggregation. In the contiguous intra-band carrier aggregation, carriers are adjacent to one another and aggregated channel can be considered by a user equipment as a single enlarged channel from a radio frequency ("RF") viewpoint and only one transceiver is required within the user equipment (usually, more transceivers are required where the channels are not adjacent). In the non-contiguous intra-band carrier aggregation typically requires two transceivers and a multi-carrier signal is not treated as a single signal. In the inter-band non-contiguous carrier aggregation, multiple transceivers are required to be present within a single user equipment, which can affect cost, performance and power. Additionally, this aggregation technique can require reduction in intermodulation and cross modulation from the two transceivers. When carriers are aggregated, each carrier can be referred to as a component carrier. There exist two categories of component carriers: a primary component carrier (i.e., main carrier in any group; there are a primary downlink carrier and an associated uplink primary component carrier), and a secondary component carrier (there are one or more secondary component carriers). Association between downlink primary and corresponding uplink primary component carriers is cell specific.

When LTE carrier aggregation is used, it is necessary to be able to schedule the data across the carriers and to inform the terminal of the DCI rates for different component carriers. Cross-carrier scheduling can be achieved individually via RRC signaling on a per component carrier basis or a per user equipment basis. When no cross-carrier scheduling is arranged, the downlink scheduling assignments can be achieved on a per carrier basis. For the uplink, an association can be created between one downlink component carrier and an uplink component carrier. When cross-carrier scheduling is active, the physical downlink shared channel ("PDSCH") on the downlink or the physical uplink shared channel ("PUSCH") on the uplink is transmitted on an associate component carrier other than the physical downlink control channel ("PDCCH"), the carrier indicator in the PDCCH provides the information about the component carrier used for the PDSCH or PUSCH. The PDSCH is the main data bearing channel allocated to users on a dynamic basis and that carries data in transport blocks ("TB") that correspond to a MAC packet data unit ("PDU"), which are passed from the MAC layer to the PHY layer once per transmission time interval ("TTI") (i.e., 1 ms). The PUSCH is a channel that carries user data and any control information necessary to decode information such as transport format indicators and MIMO parameters. The PDCCH is a channel that carries resource assignment for user equipments, which are contained in a downlink control information ("DCI") message.

There exist five deployment scenarios for CA. In the first scenario, cells (e.g., F1 and F2 cells) can be co-located and overlaid, thereby providing nearly the same coverage. Both layers provide sufficient coverage and mobility can be supported on both layers. In the second scenario, cells F1 and F2 can be co-located and overlaid, however, F2 cells have smaller coverage due to larger path losses, where only F1 cells provide sufficient coverage and F2 cells are used to improve throughput. Here, mobility is performed based on F1 cells coverage. In the third scenario, F1 and F2 cells are co-located and overlaid, however, F2 cells have smaller coverage due to larger path losses, where only F1 cells provide sufficient coverage and F2 cells are used to improve throughput. Here, mobility is based on F1 cells coverage. In the fourth scenario, F1 cells provide macro coverage and F2 cells' remote radio heads are used to improve throughput at hot spots, where mobility is again performed based on F1 cells coverage. In the fifth scenario, which is similar to the second scenario, frequency selective repeaters are deployed so that coverage is extended for one of the carrier frequencies. It is expected that F1 and F2 cells of the same eNodeB can be aggregated where coverage overlaps.

B. Coordinated Multipoint Transmission

As stated above, the CoMP transmission feature is used to send and receive data to and from a user equipment from several points to ensure that the improved performance is achieved even at cell edges. CoMP enables dynamic coordination of transmission and reception over a variety of different base stations to improve overall quality for the user as well as improve utilization of the network. CoMP further requires close coordination between several geographically separated eNodeBs to provide joint scheduling and transmissions, joint processing of received signals, thereby allowing a user equipment at the edge of a cell to be served by two or more eNodeBs so as to improve signal reception/transmission and increase throughput.

There exist four deployment scenarios for CoMP. The first scenario involves a homogeneous network with intra-site CoMP. The second scenario also involves a homogeneous network but with high transmission power RRHs. The third scenario involves a heterogeneous network with low power RRHs within a macro cell coverage, where transmission/reception points created by the RRHs have different cell identifiers as the macro cell. The fourth scenario involves a heterogeneous network with low power RRHs within a macro cell coverage, where transmission/reception points created by the RRHs have the same cell identifiers as the macro cell.

Joint reception and processing as well as coordinated scheduling can be implemented in the uplink CoMP. Joint reception and processing format uses antennas at different sites and by coordinating between different base stations, a virtual antenna array can be formed. Signals received by the base stations are combined and processed to produce the final output signal. The joint reception and processing format results in reduction of errors even when low strength signals or signals masked by interference are received. Coordinated scheduling format coordinates scheduling decisions among multiple base stations to reduce or minimize interference. This format allows for a reduced load in the backhaul as only the scheduling data is transferred between different coordinating base stations.

C. Ethernet-Based Front Haul in Intelligent LTE RAN

Figure 4:
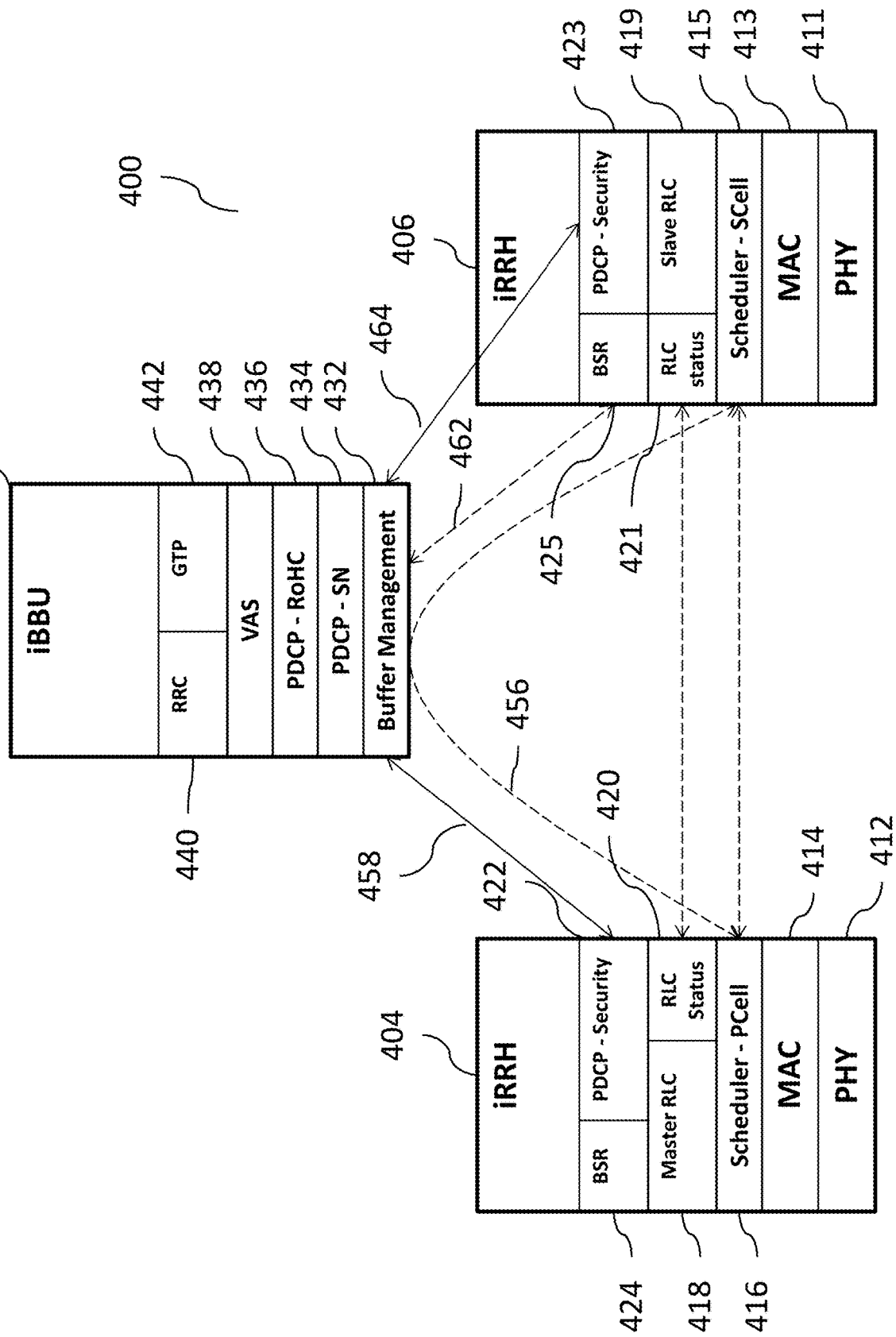
FIG. 4 illustrates an exemplary intelligent Long Term Evolution Radio Access Network implementing carrier aggregation feature, according to some implementations of the current subject matter.

FIG. 4 illustrates an exemplary system 400, according to some implementations of the current subject matter. An exemplary system 400 is disclosed in co-owned, co-pending U.S. patent application Ser. No. 14/179,421, filed Feb. 12, 2014, and entitled "Long Term Evolution Radio Access Network," the disclosure of which is incorporated herein by reference in its entirety. The system 400 can be configured to implement 4G LTE-Advanced features, including carrier aggregation feature. The system 400 can include an intelligent baseband unit ("iBBU") 402, a primary cell ("Pcell") intelligent remote radio head 404 and one or more secondary cells ("Scell") intelligent remote radio heads 406. In LTE CA, the Pcell is the serving cell where the UE has an RRC connection with the radio access network. Pcell can only be changed through a successful execution of a handover procedure. Scell is a secondary cell that can be added/ removed from the configured cells list when the UE moves into/out of its coverage area. The configuration of a Scell is done by RRC based on mobility measurement events triggered in the UE and sent to RRC.

As shown in FIG. 4, each iRRH 404 and 406 can both include the LTE layer 1 (i.e., the PHY layer) and have LTE layer 2 (i.e., MAC, PDCP, RLC) split among themselves as well as iBBU 402. The iRRH 404 can include a PHY layer 412, a MAC layer 414, a scheduler-Pcell component 416, a master RLC component 418, a RLC status component 420, a PDCP-security component 422, and a BSR component 424. Similarly, the iRRH 406 can include a PHY layer 411, a MAC layer 413, a scheduler-Scell component 415, a slave RLC component 419, a RLC status component 421, a PDCP-security component 423, and a BSR component 425. The iBBU 402 can include a buffer management component 432, a PDCP-SN component 434, a PDCP-RoHC component 436, a VAS component 438, an RRC component 440, and a GTP component 442.

The buffer management component 432 can implement use of buffer occupancy reports that can be received from the iRRH's to control flow of user data to the Pcell and/or Scell in order to enable in sequence delivery of the data to the user equipment. The PDCP-SN component 434 can perform sequence numbering of the PDCP service data units ("PDCP SDUs"). The PDCP robust header compression ("PDCP-RoHC") component 436 can perform IP header compression for voice-over-LTE service flows. The value added services ("VAS") component 438 can provide application intelligence in the eNodeB by performing shallow packet inspection and deep packet inspection of data flows. This component can also determine how a particular data flow can be treated. A shallow packet inspection ("SPI") can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection ("DPI") can be performed by examining other layers of the data packet. In some implementations, the payload of a data packet can be inspected to determine what resource blocks should be assigned to the data packet.

The iRRH 404 and the iRRH 406 can communicate with one another via an inter-iRRH interface, which can be a direct connection 452, or a connection that can be shared with a fronthaul connection 458. The iRRH 404 can communicate with the iBBU 402 using the fronthaul ("FH") connection 458 and the iRRH 406 can communicate with the iBBU 402 using FH connection 464.

In some implementations, the iBBU 402 can provide a centralized remote radio resource control ("RRC") using RRC component 440, thereby eliminating a need for a long-delay inter-RRC coordination and providing an ability to configure LTE layer 2 in iRRH 404 and 406. This capability can be implemented as part of the coordinated multipoint transmission feature, as discussed below.

As shown in FIG. 4, the functionalities associated PDCP protocol can be split among the iBBU 402, the iRRH 404, and the iRRH 406. The PDCP-ROHC 436 (where ROHC refers to robust header compression protocol that is used to compress packets) and the PDCP-SN 434 (where SN refers to sequence numbering) together with buffer management component 432 in iBBU 402 can be referred to as PDPC-upper, and PDCP-security 422, 423 in iRRH 404, 406, respectively, can be referred to as PDCP-lower. By having PDCP-upper in the iBBU 402 and PDCP-lower in iRRH 404, 406, the PDCP functionalities can be centralized to handle the ROHC and sequence numbering functions by the iBBU 402, and ciphering functions by the iRRH (which refer to known functionalities of the PDPC). In some implementations, the PDCP-upper in iBBU 402 can also handle coordination of data flows to the schedulers in the iRRHs.

Further, by using PDCP-upper and PDCP-lower, flow control between iBBU 402 and iRRH 406 can be provided. The flow control can depend on an estimated data rate for the bearer. For example, on the downlink 462, the PDCP-upper can send compressed and numbered packets to Pcell iRRH 404 and Scell iRRH 406 in proportion based on buffer occupancy level and estimated data rate from the reports provided by PDCP-lower. In some implementations, the PDCP-lower can generate a report of a buffer occupancy level. This report can be generated periodically, upon request, automatically, manually, and/or on for any period of time. Based on the report, the PDCP-upper can estimate a buffer draining rate based on consecutive buffer occupancy reports (e.g., two reports), a time that elapsed between the reports and the additional data that was sent to the buffer between the reports.

The iBBU 402 can include a buffer management function 432 to support the in-sequenced delivery of PDCP packet data units ("PDCP PDU") and support value added services ("VAS") multi-queue implementation for the default bearer. The buffer management function 432 can detect buffer stalling in the Scell 406 and trigger a redirection of the staled PDCP PDU packets to the Pcell 404. PDCP-lower can detect outdated packets and discard them from its buffer. The in-sequenced delivery of PDCP PDUs can refer to a requirement for data flow transmitted in RLC acknowledged and unacknowledged modes. VAS multi-queue implementation can enable prioritization of data flows within the default bearer. In some implementations, the detection of buffer stalling can be based on an estimated buffer drain rate that can be derived from the buffer occupancy reports received from the PDCP-lower.

In some implementations, to perform redirection of packets, the PDCP-upper can tag each packet data unit with time-to-live information (which can refer to an amount of time before a data packet expires). Then, the PDCP-lower can remove the packet from its buffer when the time-to-live timer for that packet expires and inform the PDCP-upper of the deleted packet's number. The PDCP-upper can decide whether to resend the deleted packet to the same PDCP-lower and/or redirect the deleted packet to a PDCP-lower of another iRRH. The discarding of packets can be performed on the Pcell and/or the Scell and the packets can be redirected toward the Pcell and/or the Scell.

In some implementations, the RLC protocol handling can be split between iRRH 404 and iRRH 406, where the iRRH 404 can include a master RLC component 418 and the iRRH 406 can include a slave RLC component 419. The master RLC component 418 can allocate an RLC PDU sequence number to the slave RLC component 419, thereby centralizing RLC PDU sequence numbering process. In the current subject matter system, each RLC entity can maintain a list of unacknowledged PDUs that it has transmitted and thus, handle the ARQ procedures for only those unacknowledged PDUs that it has transmitted. This is because the RLC entity might not be aware of other PDUs that can be sent by other entities and/or might not have the original data to handle the re-transmissions of the unacknowledged PDUs. In some implementations, an RLC ARQ status PDU, which can be sent from a user equipment at a rate of once very few 10's of a millisecond, can be shared between the two RLC entities over the inter-iRRH interface, i.e., the direct connection 452 and/or a connection shared with fronthaul 458. In some implementations, the physical connection for this inter-iRRH interface can either be direct and/or through a L2 Ethernet switch. In some implementations, the above inter-iRRH interface can leverage industry standard stream control transport protocol ("SCTP") over IP. The application layer information exchange can be based on an inter-process communication protocols.

In some implementations, the inter-iRRH interface 452 can provide a low latency interface for sharing of the RLC status information PDUs as well as any other information between iRRHs 404 and 406. Channel state information ("CSI"), acknowledgement/non-acknowledgement ("ACK/NACK") signaling, precoding matrix indicator ("PMI"), and rank indicator ("RI") that are received by the Pcell iRRH 404 can be forwarded over the inter-iRRH interface 452 for sharing with an Scell scheduler 415 via the fronthaul or direct gigabit Ethernet ("GE") connection. This information can be available to the Scell scheduler on the same subframe that it was sent in order not to incur any impact the H-ARQ RTT, which can be targeted to be 8 ms. The Scell scheduler can also accommodate longer delay in obtaining the H-ARQ feedback and can impact H-ARQ round trip time on the Scell.

In some implementations, the inter-iRRH interface 452 can be used by the Scell iRRH 406 to inform the Pcell iRRH 404 which PUCCH resource to expect the arrival of the H-ARQ ACK/NACK feedback for a packet sent on the Scell (where the allocation of PUCCH resources is defined in the 3GPP Standards for 4G LTE). By way of a non-limiting example, the scheduler can be designed to determine which user equipment to schedule 2 ms in advance of when the data is transmitted over the air. The H-ARQ ACK/NACK can be sent from the user equipment 4 ms after the data has been received. Thus, to ensure the Pcell iRRH 404 is informed of the PUCCH resource usage before the downlink H-ARQ ACK/NACK information arrives from the user equipment, an exemplary one-way latency for the inter-iRRH interface 452 might not be more than 4 ms. As can be understood, the above is provided as an illustrative non-limiting, exemplary implementation of the current subject matter system. It should be further understood that the current subject matter system is not limited to specific data scheduling parameters and/or particular latency associated with transmission of data, and can be designed using any scheduling, latency and/or any other parameters.

In some implementations, the inter-iRRH transport 456 can be shared with the fronthaul and switched at the iBBU 402 and/or a physical direct connection 452 between the iRRHs 404, 406 using a gigabit Ethernet interface. When the inter-iRRH interface is configured as a switched connection 456 across the fronthaul, the fronthaul latency can be based on a very low latency transport such as in the case when the iBBU 402 and the iRRHs 404 and/or 406 are collocated and/or when based on LOS wireless transport such as MW, mmWave, FSO, when the iRRH's are geographically separated.

IV. New Radio Multi-Technology Aggregation Communications Networks

In some implementations, the current subject matter relates to a 5G new radio ("NR") communications system. The 5G NR is a proposed next telecommunications standard beyond the current 4G/IMT-Advanced standards. 5G networks are planned to offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks are planned to have an improved support of device-to-device communication, lower cost, lower latency than 4G equipment and lower battery consumption, etc. Such networks are planned to have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 5:
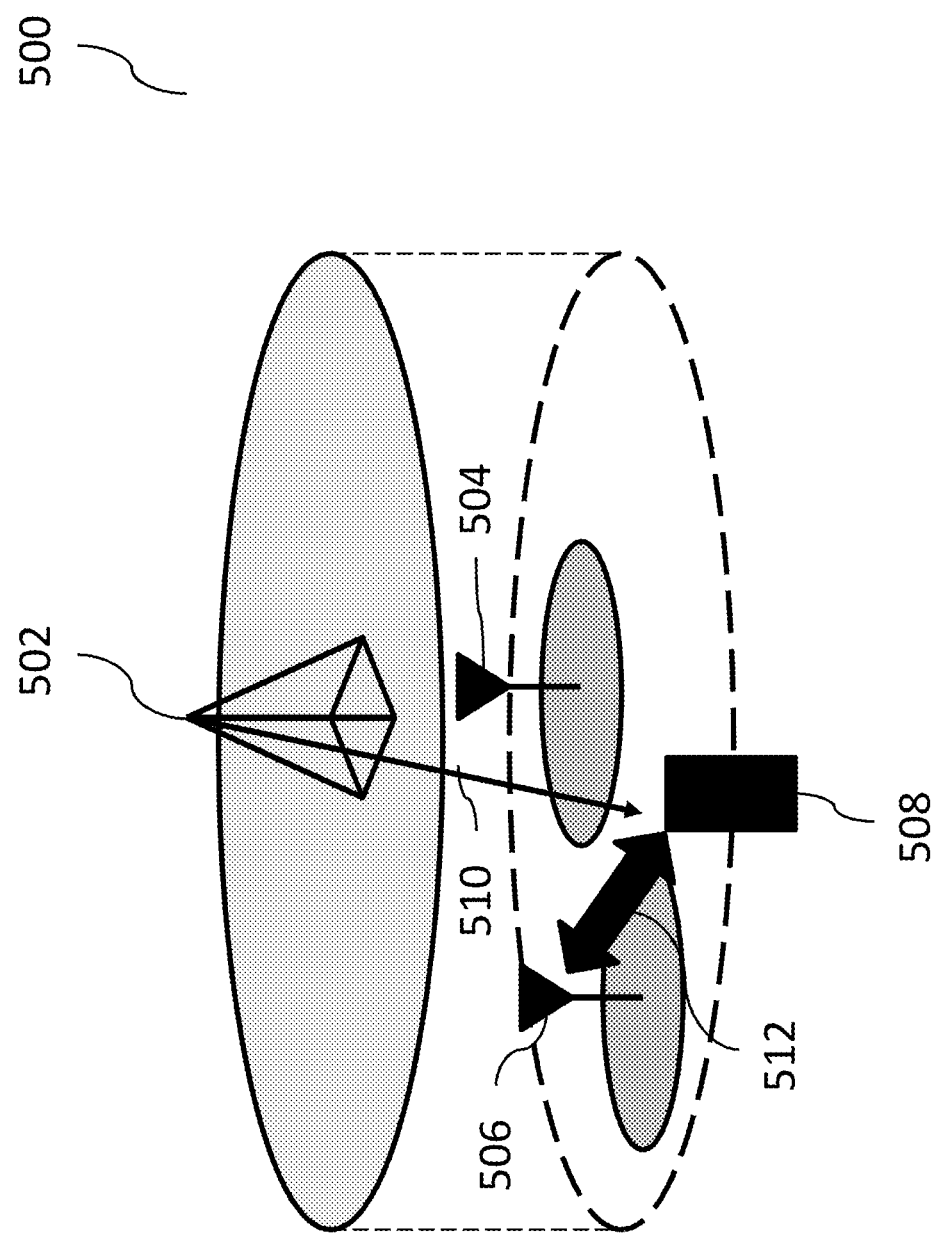
FIG. 5 illustrates an exemplary communications system that can implement a 5G technology and can provide its users with use of higher frequency bands.

FIG. 5 illustrates an exemplary communications system 500 that can implement a 5G technology and can provide its users with use of higher frequency bands (e.g., greater than 10 GHz). The system 500 can include a macro cell 502 and small cells 504 and 506.

A mobile device 508 can be configured to communicate with one or more of the small cells 504, 506. The system 500 can allow splitting of control planes (C-plane) and user planes (U-plane) between the macro cell 502 and small cells 504, 506, where the C-plane and U-plane are utilizing different frequency bands. In particular, the small cells 502, 504 can be configured to utilize higher frequency bands when communicating with the mobile device 508. The macro cell 502 can utilize existing cellular bands for C-plane communications. The mobile device 508 can be communicatively coupled via U-plane 512, where the small cell (e.g., small cell 506) can provide higher data rate and more flexible/cost/energy efficient operations. The macro cell 502, via C-plane 510, can maintain good connectivity and mobility. Further, in some cases, LTE PUCCH and NR PUCCH can be transmitted on the same frequency.

Figure 6:
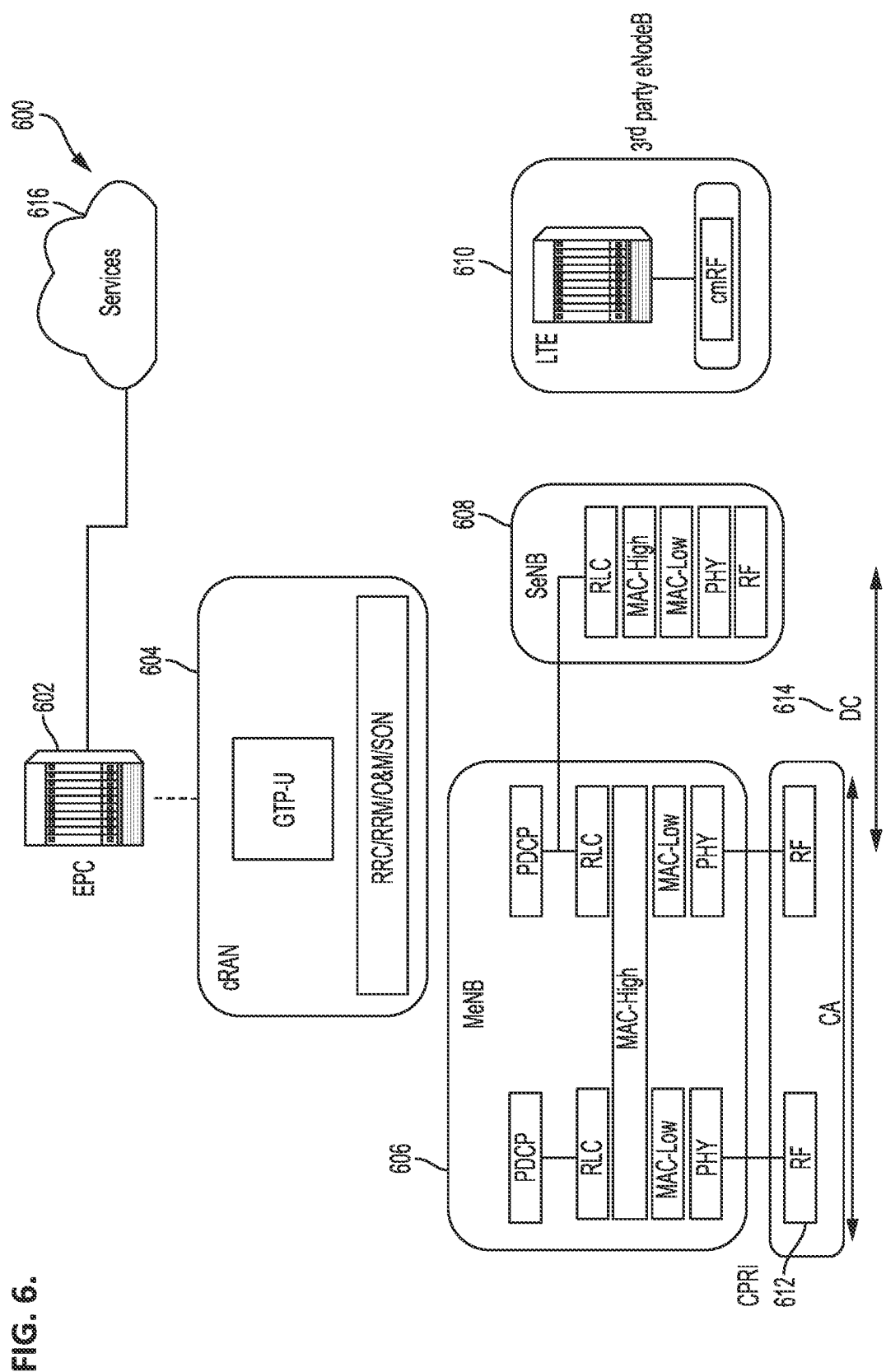
FIG. 6 illustrates an existing long term evolution communications network.

FIG. 6 illustrates an existing long term evolution communications network 600. The network 600 includes elements that are similar to those shown and described above with regard to FIGS. 1a-1d. As shown in FIG. 6, the system 600 can include an evolved packet core ("EPC") 602, communicatively coupled to a radio access network ("cRAN") 604. The cRAN 604 is communicatively coupled to one or more master eNodeB ("MeNB") 606. As discussed above, the system 600 can implement carrier aggregation ("CA") techniques to provide communication capabilities to user equipments communicating with the system 600.

The MeNB 606 can be communicatively coupled (using dual connectivity techniques ("DC")) 614 with one or more serving eNodeBs ("SeNB") 608. The MeNB 606 can also include various networking components, including PDCP, RLC, MAC, and PHY layers. The RF components 612 can be coupled to the MeNB 606 using a CPRI interface. The SeNB 608 can include corresponding components that can allow it to communicate with the MeNB 606 and/or any other third party eNodeBs 610 that also can be communicatively coupled with the system 600. The RF components 612 can be integrated into the SeNB 608. The eNodeBs can provide services ("Services") 616 to its network users, in accordance with the discussions above.

Figure 7:
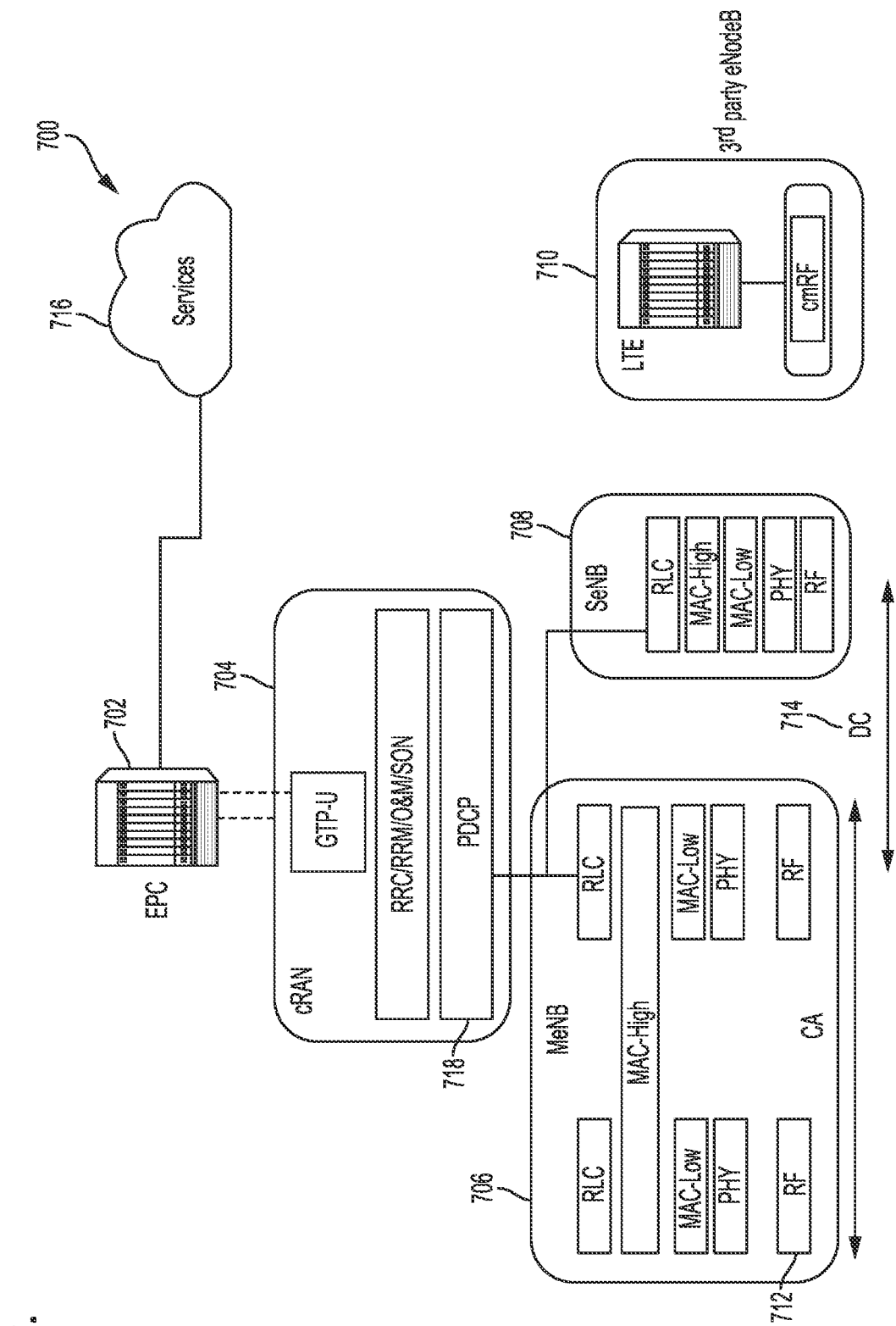
FIG. 7 illustrates an exemplary long term evolution communications network, according to some implementations of the current subject matter.

FIG. 7 illustrates an exemplary long term evolution communications network 700. As opposed to the network 600, the PDCP component 718 can be removed from the MeNB 706 and instead, incorporated into the radio access network ("cRAN") 704. Further, the RF components 712 can be incorporated into the MeNB 706. The system 700 is similar to the systems shown and described above with regard to FIGS. 1a-4. In the multi-technology aggregation communication system, which can include features of LTE and NR, iRRH components are replaced by dBBU components, iBBU components are replaced by cBBU components, where communication between dBBU and cBBU occurs via a midhaul link (by comparison, in the LTE system, a fronthaul link is used to communicate between iRRH and iBBU). Also, all dBBU components are communicatively coupled to the cBBU.

Figure 8:
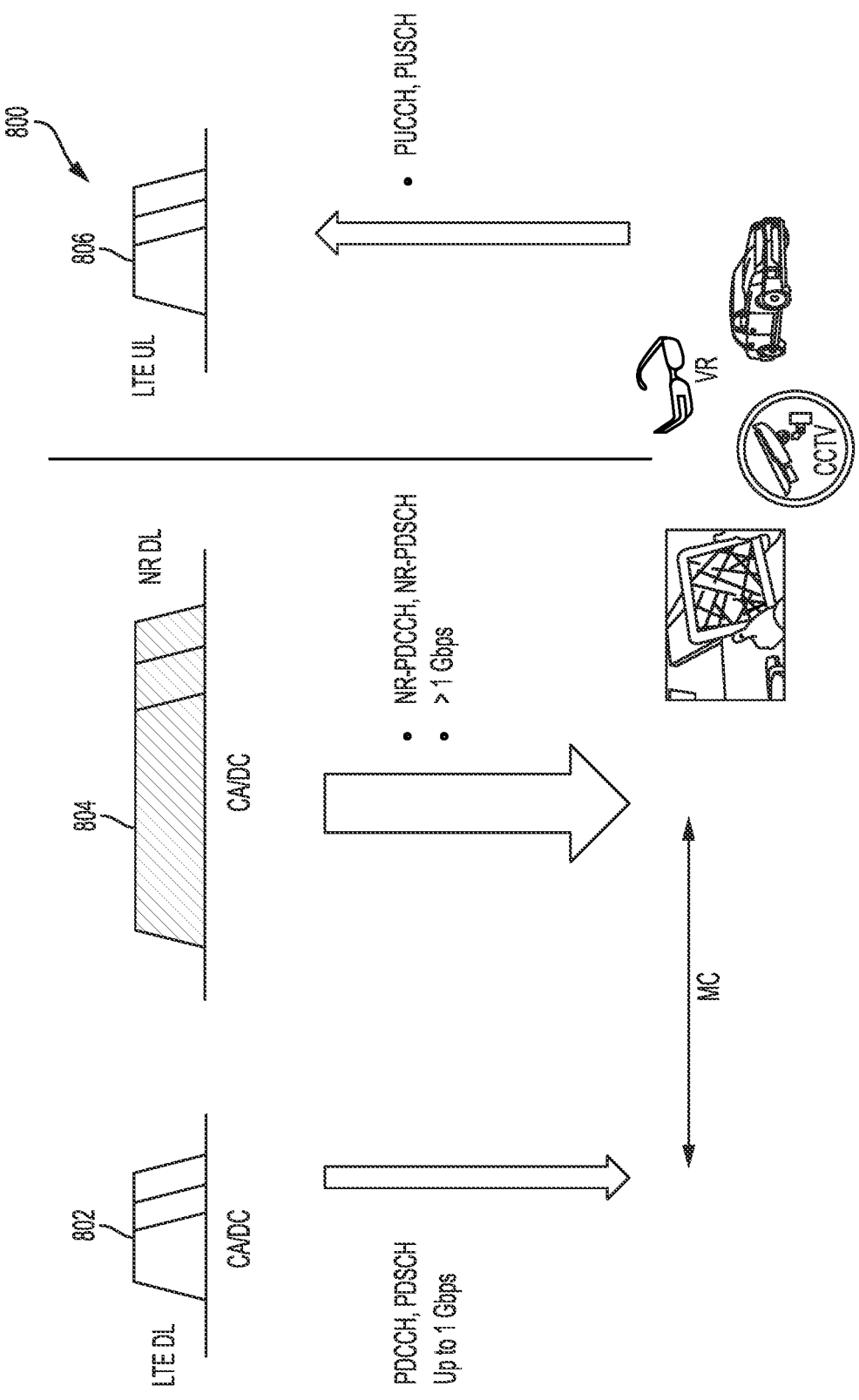
FIG. 8 illustrates an exemplary multi-technology aggregation system, according to some implementations of the current subject matter.

FIG. 8 illustrates an exemplary multi-technology aggregation system 800, according to some implementations of the current subject matter. Currently, multi-technology aggregation based on LTE dual-connectivity ("DC") architecture is supported. The multi-technology aggregation systems can support transmission of LTE uplink ("UL") and new radio uplink ("NR UL") on the same carrier frequency for reliable UL operation. For the purposes of uplink multiplexing, time-domain multiplexing ("TDM") using multi-cast-broadcast single-frequency network ("MBSFN") sub-frame and/or mini-slot and/or simultaneous transmission on the same frequency can be implemented. However, this can require two uplinks.

In some implementations, to solve the drawbacks of conventional systems, the system 800 can provide for a multi-technology aggregation architecture and interface for centralized and distributed RAN implementation that can allow for transmission of new radio (NR) uplink control information ("UCI") while reusing LTE PUCCH. Further, UCI can be transmitted on PUSCH when LTE UL data is present. As shown in FIG. 8, system 800 can include an LTE base station (e.g., eNodeB) 802, a NR base station (e.g., gNodeB) 804, and an LTE base station (e.g., eNodeB) 806. The eNodeB 806 can be the same as the eNodeB 802. The eNodeB 802 and gNodeB 804 can be used for downlink transmissions to one or more user equipments (e.g., CCTV, virtual reality devices, smartphones, cellular telephones, etc.). The eNodeB 802 can transmit PDCCH, PDSCH data on the downlink and can have a transmission rate of approximately up to 1 Gb/s. The gNodeB 804 can transmit NR-PDCCH, NR-PDSCH data on the downlink and can have a transmission rate of greater than 1 Gb/s (e.g., up to 5 Gb/s or greater). The nodes 802 and 804 can be communicatively coupled using a multi-technology aggregation network. For transmission of uplink data, the eNodeB 806 (which can be the same or different than the eNodeB 802) can be used. The user equipments can transmit PUCCH and PUSCH along with other uplink data to eNodeB 806.

Figure 9:
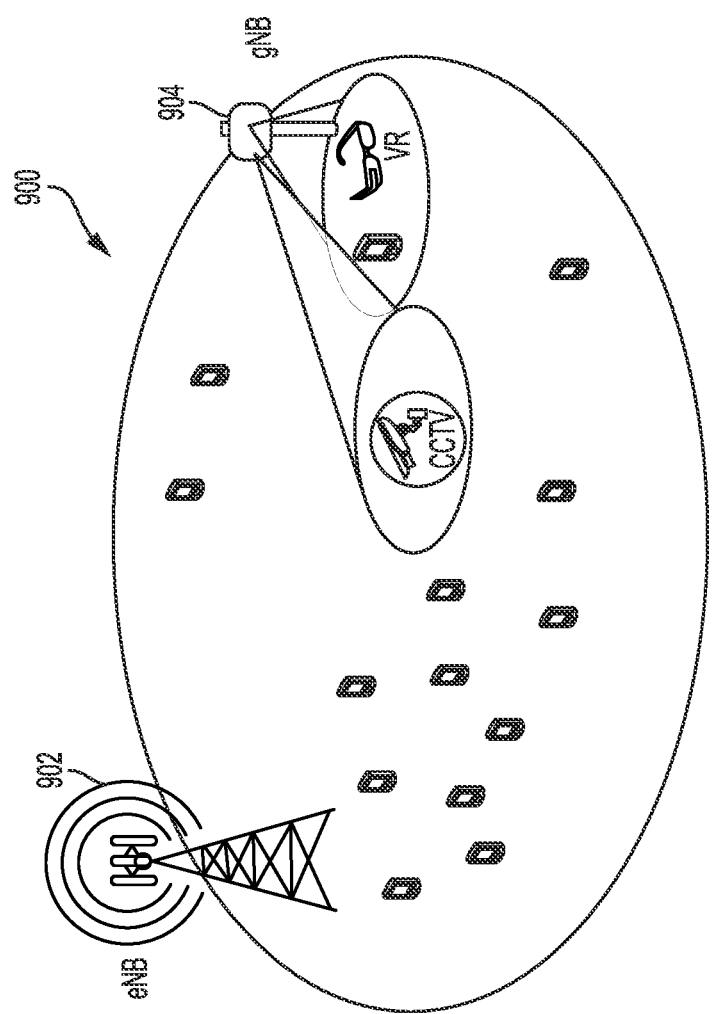
FIG. 9 illustrates an exemplary communications system, according to some implementations of the current subject matter.

FIG. 9 illustrates an exemplary communications system 900, according to some implementations of the current subject matter. The system 900 can include a base station (e.g., eNodeB) 902 and a NR base station (e.g., gNodeB) 904. The base station 902 can provide an umbrella area coverage, in which the base station 904 can be located. The base station 904 can provide multi-Gb/s peak throughput over a small area. The base station 904 can generate user equipment-specific signals/beams that can provide a large areal spectral efficiency. Some user equipments in the NR cell edge (i.e., cell edge of the area covered by base station 904) can experience poor radio condition, which can lead to frequent handover, poor control channel receive performance.

Figure 10:
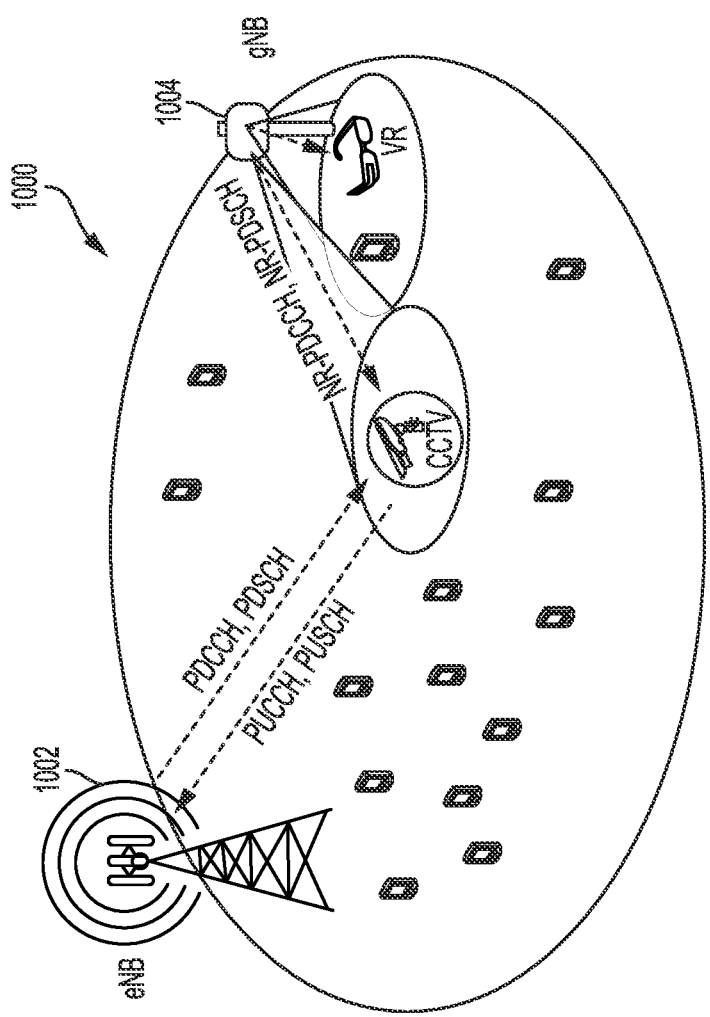
FIG. 10 illustrates an exemplary communications system, according to some implementations of the current subject matter.

FIG. 10 illustrates an exemplary communications system 1000, according to some implementations of the current subject matter. The system 1000 can be similar to system 900 shown in FIG. 9 and can include a base station (e.g., eNodeB) 1002 and a NR base station (e.g., gNodeB) 1004. Again, the base station 1002 can provide umbrella area coverage. The base station 1004 can be located in the cell area of the base station 1002. The base station 1002 can serve as a mobility anchor and can provide downlink (PDCCH, PDSCH) and uplink (PUCCH, PUSCH) transmissions for the user equipments in its cell area. Further, the base station 1002 can also receive uplink control information from the base station 1004, which can be transmitted to the base station 1002 on the uplink (PUCCH) of the base station 1002.

In some implementations, the base station 1004 can be used for downlink transmissions (capacity/throughput) only. The base station 1004 can implement active antenna system ("AAS") and beamforming ("BF") tracking algorithms for transmissions to the user-equipments located within its coverage area. Beamforming can be used for transmissions of downlink NR-PDCCH and NR-PDSCH information/data. The base station 1004 can generate transmission beams on-demand, based on capacity needs, and/or based on any other parameters. The base station 1004 can also perform various advanced multi-site processing functions.

Figure 11:
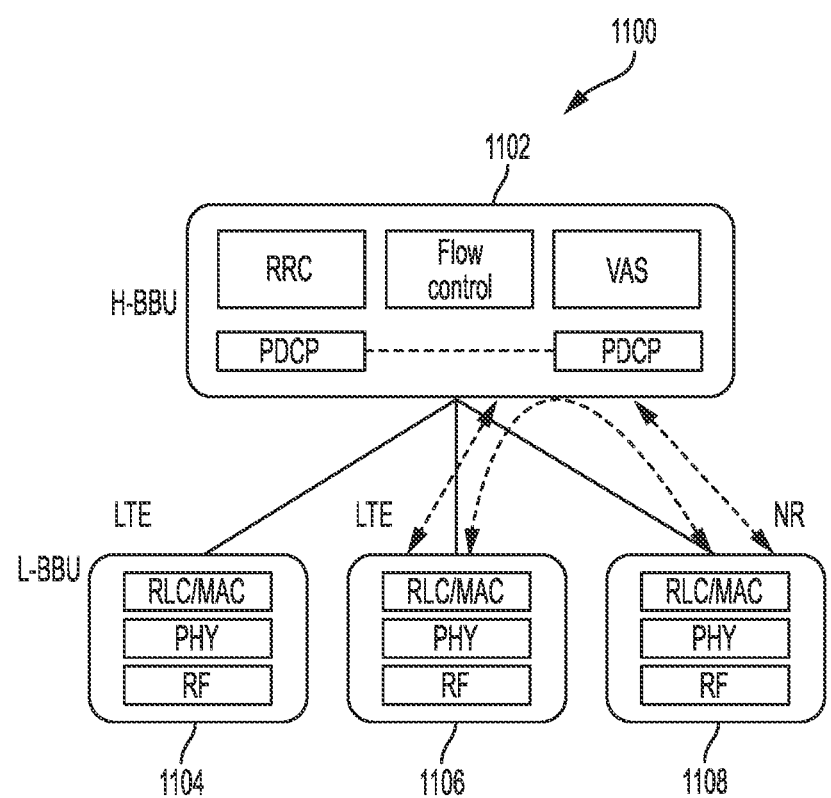
FIG. 11 illustrates an exemplary communication system that can implement a centralized higher baseband unit ("BBU") structure

FIG. 11 illustrates an exemplary communication system 1100 that can implement a centralized higher baseband unit ("BBU") structure. The system 1100 can include a higher BBU ("H-BBU") component 1102 and lower BBU ("L-BBU") components 1104-1108. The H-BBU component 1102 can include RRC, flow control, VAS, and PDCP functionalities. The L-BBU components 1104-1108 can include RCL/MAC, PHY, and RF layers/components. The L-BBU components 1104 and 1106 can be configured as LTE components and L-BBU component 1108 can be configured as NR component. The information from the eNodeBs and gNodeB (i.e., respective L-BBU components) can be transmitted to the H-BBU component 1102. This can be accomplished using Xx-C (control), and Xx-U interfaces.

In some implementations, the downlink scheduling can be performed as follows. The eNodeB can transmit uplink control information ("UCI") to gNodeB, which can include downlink ACK/NACK, channel state information ("CSI"), precoding matrix indicator ("PMI"), and rank indicator ("RI"). The gNodeB can transmit downlink control information ("DCI") to eNodeB, which can include modulation coding scheme ("MCS"), and resource indication value ("RIV"). As part of the flow control in the system 1100, buffer status information (eNodeB/gNodeB), average throughput (eNodeB/gNodeB), cell loading (eNodeB/gNodeB), and channel quality (eNodeB/gNodeB) can be provided. For the purposes of activation/deactivation of the gNodeB, reference signal received power ("RSRP") and reference signal received quality ("RSRQ") (eNodeB/gNodeB) along with activation/deactivation information can be used. The eNodeB/gNodeB can also configure discontinuous reception parameter ("DRX") through configuration of various RRC parameters. Additionally, gNodeB radio resource configuration and measurement and mobility control information can also be utilized in the system 1100.

Figure 12:
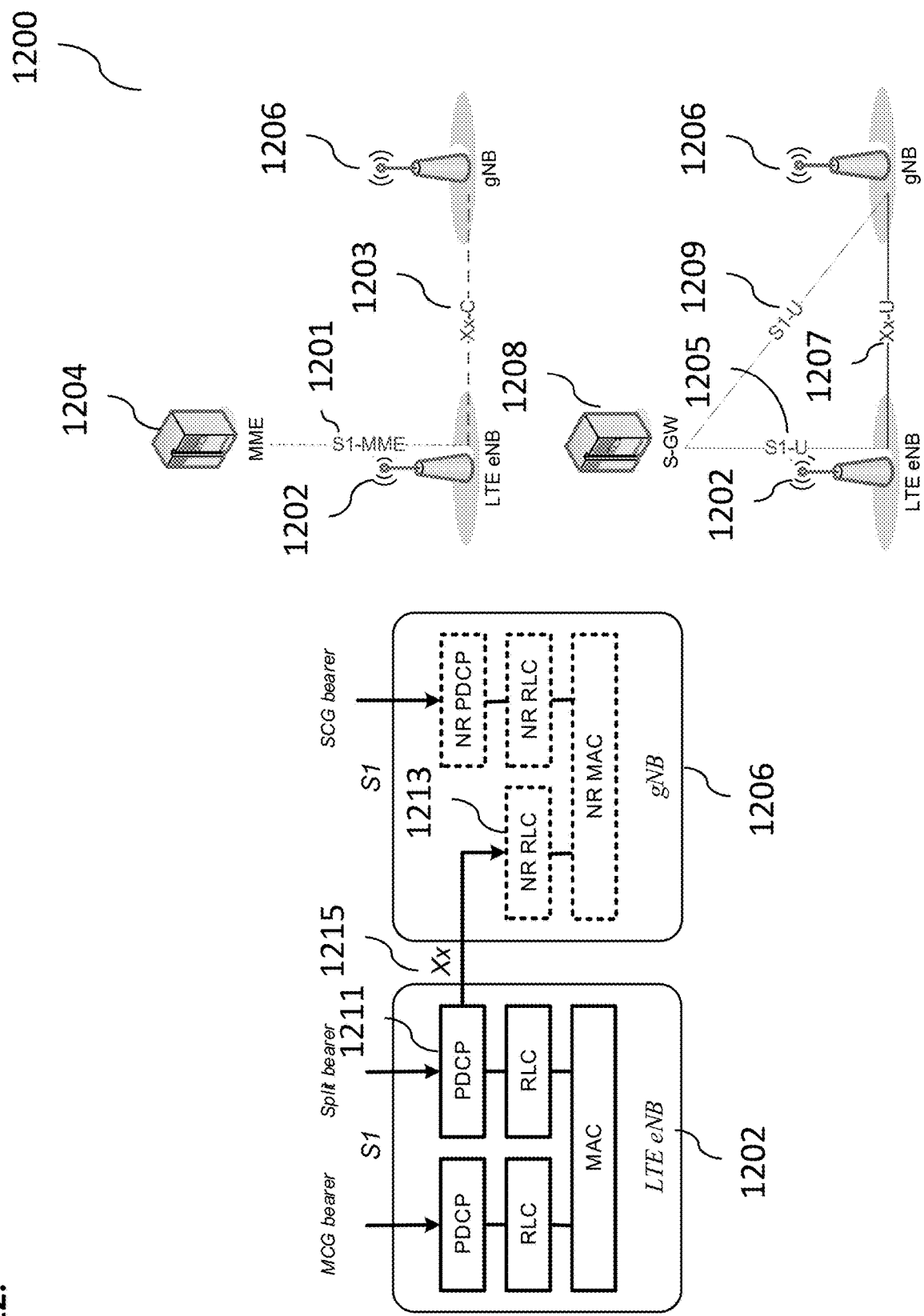
FIG. 12 illustrates an exemplary LTE-NR internetworking architecture.

FIG. 12 illustrates an exemplary LTE-NR internetworking architecture 1200. As shown in FIG. 12, an LTE eNodeB 1202 can be communicatively coupled to the MME 1204 of EPC via S1-MME interface 1201 and to gNodeB 1206 via an Xx-C interface 1203. Additionally, the LTE eNodeB 1202 can be communicatively coupled to the S-GW 1208 of EPC via S1-U interface 1205 and to gNodeB 1206 via an Xx-U interface 1207. The gNodeB 1206 can be communicatively coupled to the S-GW 1208 using an S1-U interface 1209. In particular, a PDCP component 1211 of the LTE eNodeB 1202 can be communicatively coupled to the new radio (NR) RLC component 1213 of the gNodeB 1206 via the Xx interface 1215.

Figure 13:
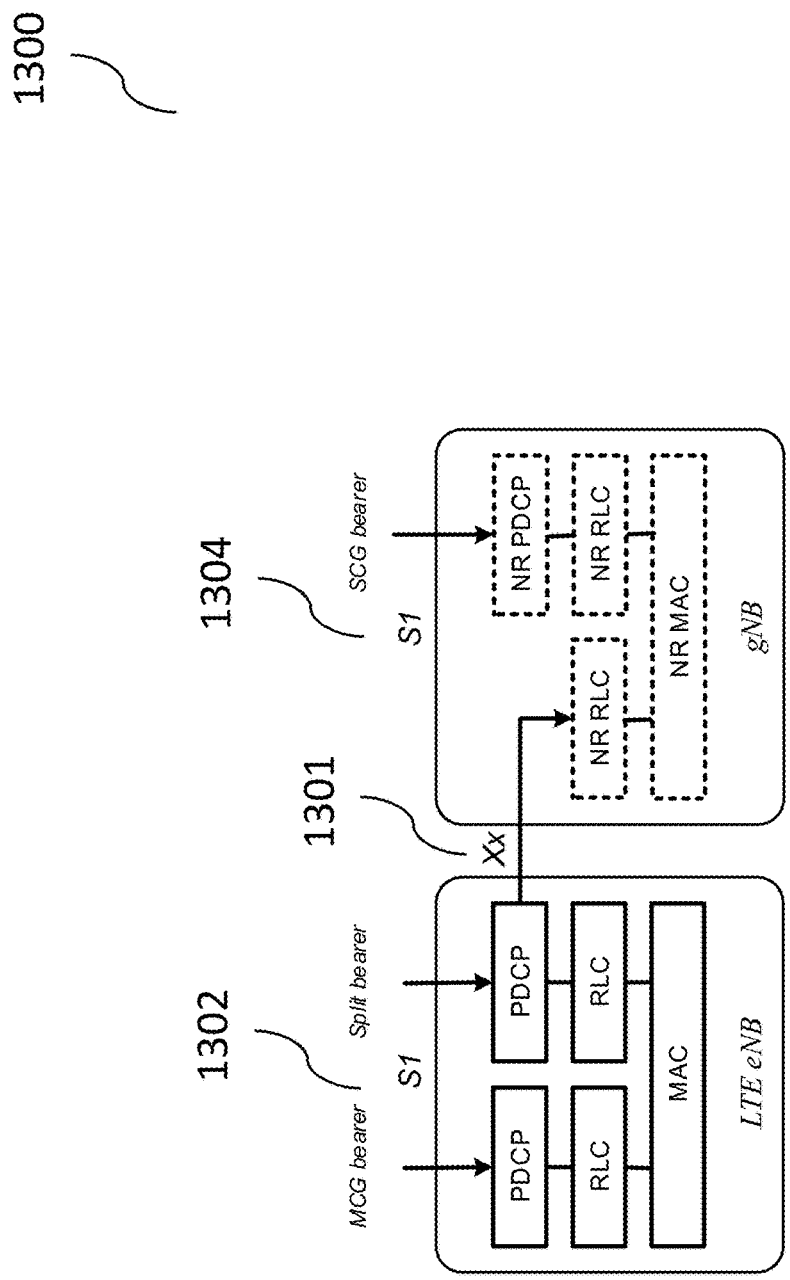
FIG. 13 illustrates an exemplary architecture that can implement the Xx interface between the LTE eNodeB and NR gNodeB.

FIG. 13 illustrates an exemplary architecture 1300 that can implement the Xx 1301 interface between the LTE eNodeB 1302 and NR gNodeB 1304. The Xx interface 1301 can include a control interface (Xx-C) and a user interface (Xx-u). In some implementations, the downlink scheduling can be performed by having the eNodeB 1302 transmit uplink control information ("UCI") to gNodeB, which can include downlink ACK/NACK, channel state information ("CSI"), precoding matrix indicator ("PMI"), and rank indicator ("RI"). The gNodeB can transmit downlink control information ("DCI") to eNodeB, which can include modulation coding scheme ("MCS"), and resource indication value ("RIV"). In the flow control, buffer status information (eNodeB/gNodeB), average throughput (eNodeB/gNodeB), cell loading (eNodeB/gNodeB), and channel quality (eNodeB/gNodeB) can be provided. To activate/deactivate the gNodeB, reference signal received power ("RSRP") and reference signal received quality ("RSRQ") (eNodeB/gNodeB) along with various activation/deactivation information can be provided. The eNodeB/gNodeB can also configure discontinuous reception parameter ("DRX"). The gNodeB radio resource configuration and measurement and mobility control information can also be used in the system 1300.

Figure 14A:
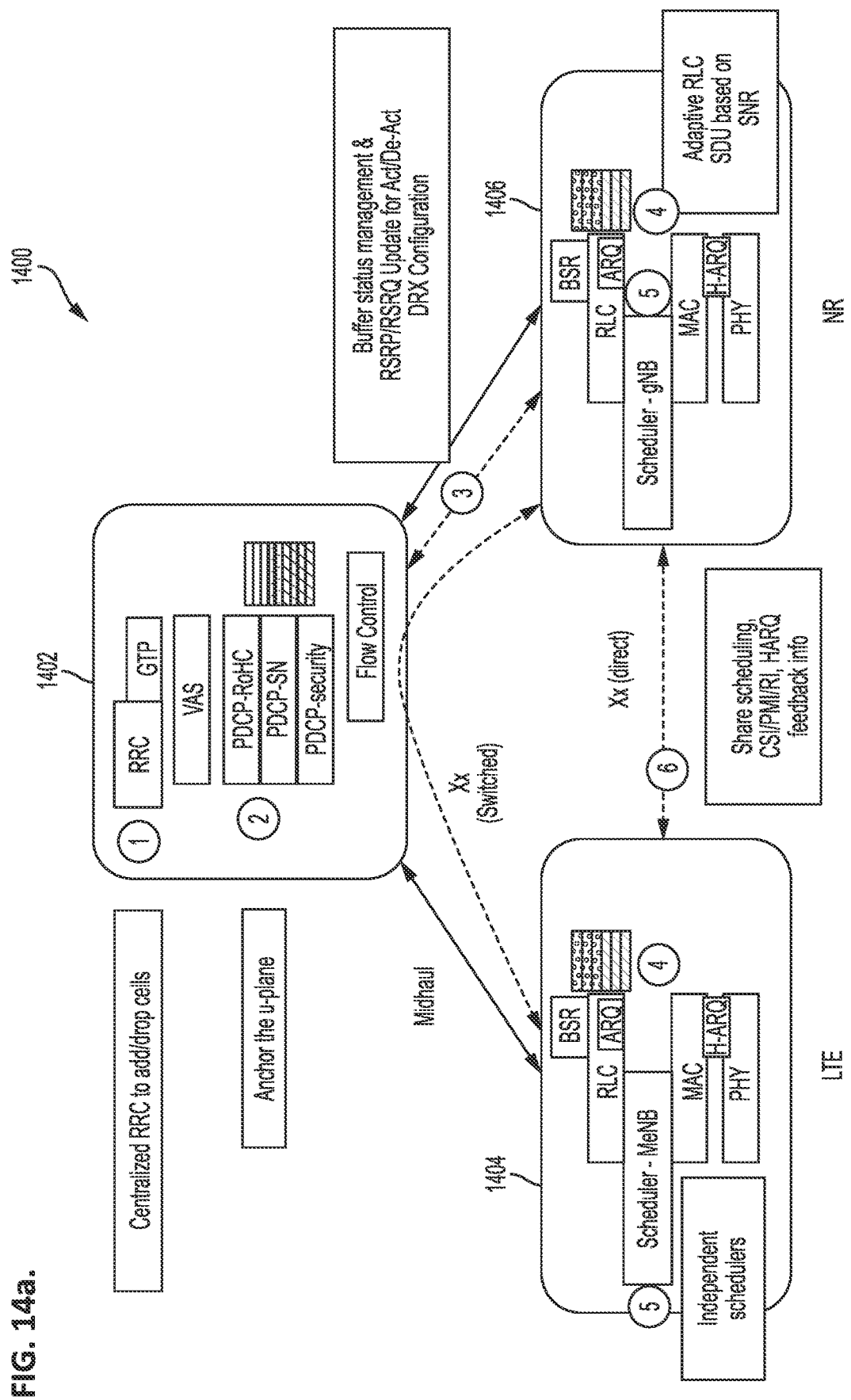
FIG. 14a illustrates an exemplary multi-technology aggregation centralized virtual RAN architecture, according to some implementations of the current subject matter.

FIG. 14a illustrates an exemplary multi-technology aggregation centralized virtual RAN architecture 1400, according to some implementations of the current subject matter. The architecture 1400 can include a centralized unit 1402, a master eNodeB ("MeNB") unit 1404 and a gNodeB ("gNB") unit 1406. The centralized unit 1402 can include at least the following components: RRC, GPRS tunneling protocol ("GTP"), a VAS, PDCP-RoHC, PDCP-SN, PDCP-security, and flow control. The MeNB unit 1404 can be communicatively coupled to the centralized unit 1402 via a midhaul (which can include a backhaul link from small cell to master cell or from lower BBU to higher BBU). The MeNB unit 1404 can include at least the following components: a BSR, RLC (along with ARQ), scheduler-MeNB, and MAC/PHY layers (along with H-ARQ). The gNB unit 1406 can be communicatively coupled to the MeNB unit 1404 using an Xx (direct) interface. The gNB unit 1406 can include at least the following components: a BSR, RLC (along with ARQ), scheduler-gNB, and MAC/PHY layers (along with H-ARQ).

In some implementations, RRC component in the centralized unit 1402 can be used to add/drop cells (e.g., gNB, eNodeB, etc.). The PDCP components can be used to anchor the U-plane. The flow control component in the centralized unit 1402 can provide buffer status management and RSRP/RSRQ updates for activation/deactivation of the gNB unit 1406, and DRX configuration. In the gNB unit 1406, signal to noise ratio ("SNR") can be used to generate an adaptive RLC service data unit ("SDU"). The scheduler-gNB component in the unit 1406 can communicate with the scheduler-MeNB component in the unit 1404 via Xx-interface. The schedulers can share various scheduling information, CSI, PMI, RI, HARQ feedback information, and/or any other information.

In some implementations, for the purposes of UCI multiplexing and transmission, the system 1400 can utilize a frequency F1_DL for the purposes of transmission of LTE downlink information. For uplink LTE transmission, frequency F1_UL can be used. Frequency F2 can be utilized for transmission of NR uplink control information. For example, the information can include ACK/NACK corresponding to NR downlink transmission, NR CSI feedback estimated based on NR DL CSI RS or DM RS measurement from a user equipment, which can include at least one of the following: CQI, PMI, CQI, RI as well as PMI in the form of angle of arrival ("AOA") and magnitude estimation from the RS. Further, the NR uplink control information can include a scheduling request ("SR"). Further, the NR UCI can be mapped to LTE PUCCH and transmitted on frequency F1_UL.

Figure 14B:
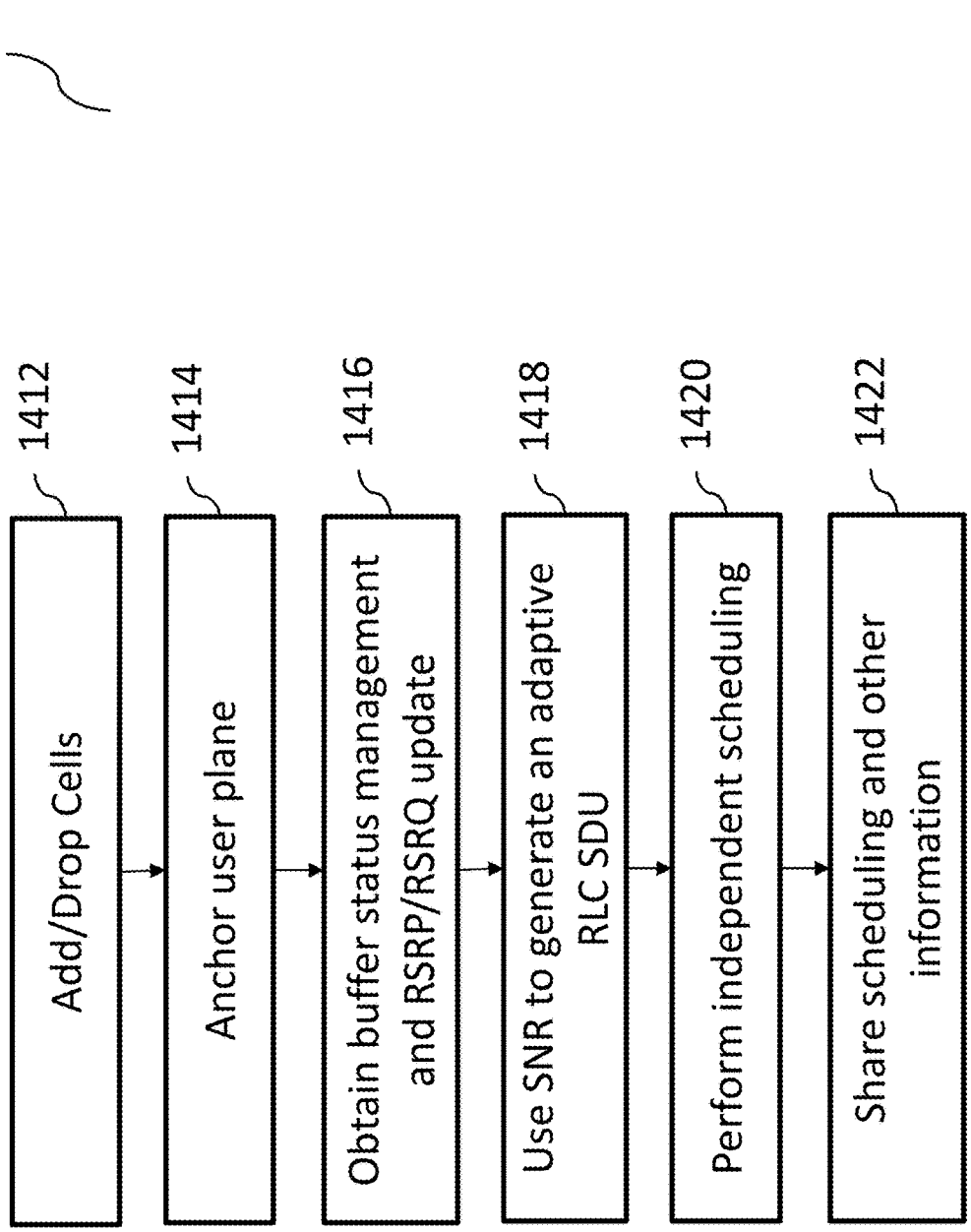
FIG. 14b illustrates an exemplary process that can be performed by the system shown in FIG. 14a, according to some implementations of the current subject matter.

FIG. 14b illustrates an exemplary process 1410 that can be performed by the system 1400 shown in FIG. 14a. At 1412, a centralized RRC component of the centralized unit 1402 can perform addition and/or dropping of cells. At 1414, various PDCP components in the centralized unit 1402 can perform anchoring of the user plane. At 1416, buffer status management and/or RSRP/RSRQ updates for activation/deactivation DRX configuration can be communicated between the centralized unit 1402 and the NR gNB 1406. At 1416, adaptive RLC SDUs can be generated based on signal to noise ratio (SNR) information by both the eNB 1404 and gNB 1406. Schedulers ("Scheduler-MeNB" and "Scheduler-gNB") of the eNB 1404 and gNB 1406 can perform independent scheduling processes, at 1418. Then, the Xx direct interface between the eNB 1404 and gNB 1406 can be used to share scheduling, CSI/PMI/RI, and/or HARQ feedback information.

Figure 15:
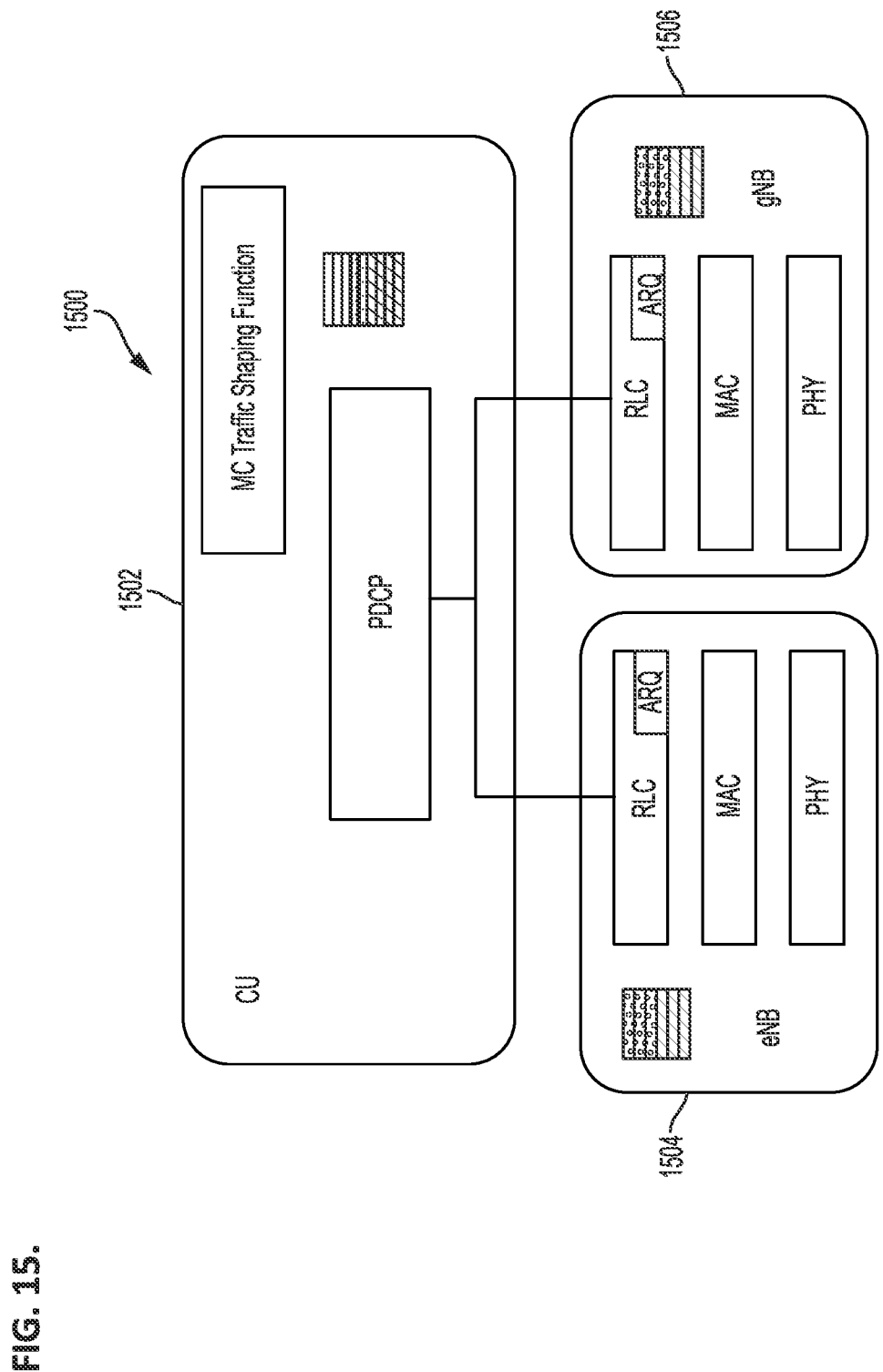
FIG. 15 illustrates an exemplary multi-technology aggregation flow control architecture, according to some implementations of the current subject matter

FIG. 15 illustrates an exemplary multi-technology aggregation flow control architecture 1500, according to some implementations of the current subject matter. The architecture 1500 can include a centralized unit ("CU") 1502, an eNB unit 1504, and a gNB unit 1506. The unit 1502 can include at least a PDCP component and a multi-connectivity ("MC") traffic shaping function. The units 1504, 1506 can include at least their respective RLC, MAC, PHY components/layers.

Figure 16:
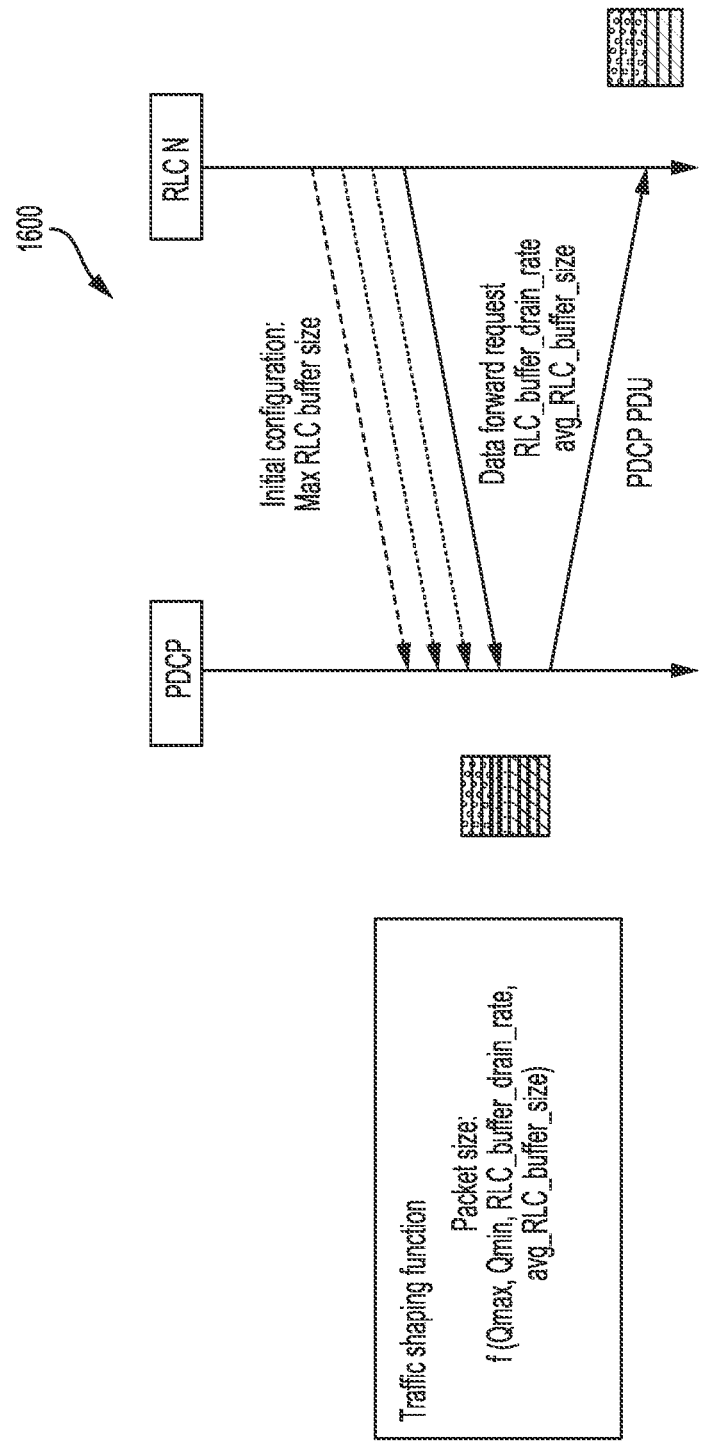
FIG. 16 illustrates an exemplary flow control algorithm that can be performed by the architecture shown in FIG. 15, according to some implementations of the current subject matter.
Figure 17:
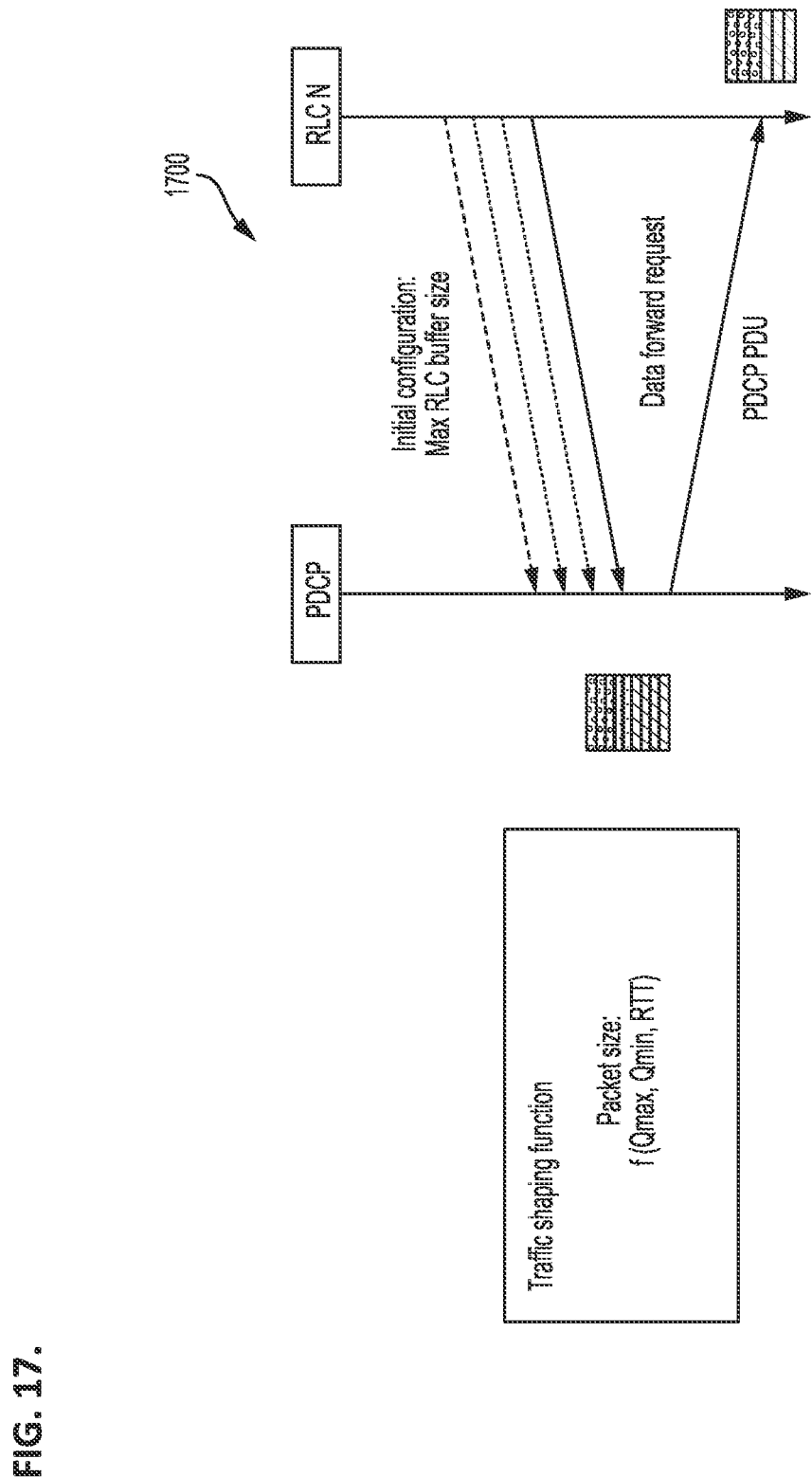
FIG. 17 illustrates an exemplary flow control algorithm that can be performed by the architecture shown in FIG. 15, according to some implementations of the current subject matter.

FIG. 16 illustrates an exemplary flow control algorithm 1600 and FIG. 17 illustrates an exemplary flow control algorithm 1700 that can be performed by the architecture 1500, according to some implementations of the current subject matter.

As shown in FIG. 16, the exemplary flow control algorithm 1600 can be performed between PDCP and RLC in CU 1502 (as shown in FIG. 15). During initial configuration during cell setup, max RLC buffer size can be transmitted from RLC to PDCP. This can include a Qmin parameter, which can be a parameter of traffic shaping function. The RLC can transmit data forward request along with RLC buffer status information (e.g., RLC_buffer_drain_rate and avg_RLC_buffer_size). Upon reception of data forward request, traffic shaping function in CU 1502 can determine the size of PDCP PDU and forward PDCP PDU to RLC. The traffic shaping function can be expressed as follows:

f(Qmax, Qmin, RLC_buffer_drain_rate, avg_RLC_buffer_size)

As shown in FIG. 17, the exemplary flow control algorithm 1700 can be similar to the flow control algorithm 1700. However, in this case, traffic shaping function can estimate the required packet size based on max/min RLC buffer size and the packet round-trip time. The PDCP can then transmit the PDCP PDU to RLC. In this case, the traffic shaping function can be expressed as follows:

f(Qmax, Qmin, RTT)

Figure 18:
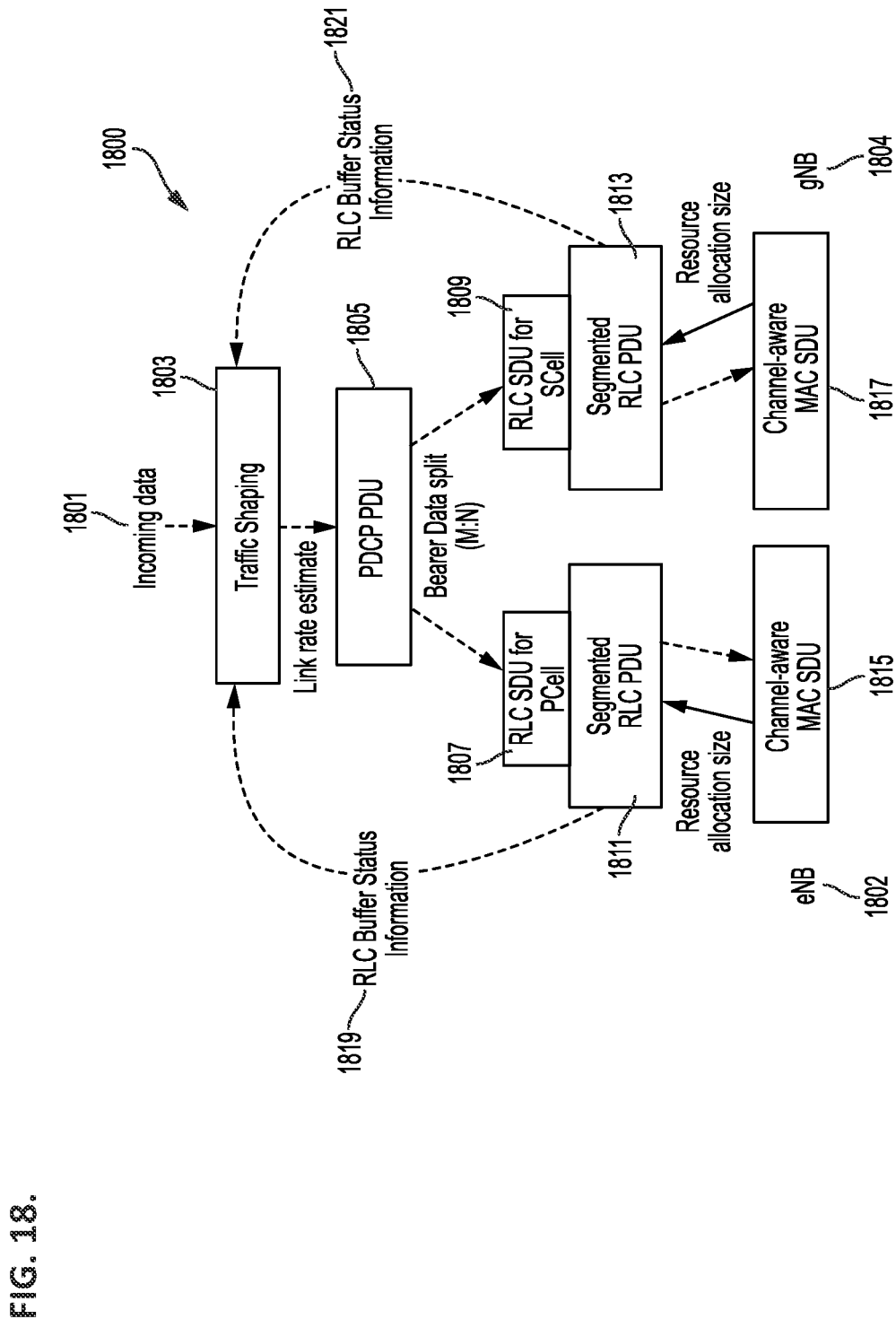
FIG. 18 illustrates an exemplary multi-technology aggregation load-balancing process, according to some implementations of the current subject matter.

FIG. 18 illustrates an exemplary multi-technology aggregation load-balancing process 1800 that can be performed using an eNB 1802 and/or gNB 1804, according to some implementations of the current subject matter. During the process 1800, an incoming data 1801 is received and processed by each RLC component (i.e., respective RLC components of eNB and gNB) can transmit data forward request to PDCP in CU (e.g., unit 1502 shown in FIG. 15). The eNB 1802 can transmit its RLC buffer status 1819 information to PDCP (which can be provided to the traffic shaping function in the CU). One or multiple gNB 1804 can also transmit its RLC buffer status 1821 information to the PDCP (which can also be provided to the traffic shaping function in the CU). Upon receiving of the data forward request, the traffic shaping function 1805 can split the bearer to multiple packet data units ("PDUs") 1805 and transmit the data to RLCs the eNB 1802 (RLC SDU for PCell 1807 and segmented RLC PDU 1811) and gNB 1804 (RLC SDU for SCell 1809 and segmented RLC PDU 1813). Channel-aware MAC SDUs 1815 and 1817 can provide resource allocation sizes to RLC components within respective eNB 1802 and gNB 1804.

In some implementations, the current subject matter can include various information related to an average buffer size as well as buffer drain rate at a distributed unit gNB (gNB-DU) for transmission of data associated with specific data radio bearer to a user equipment. This information can be provided as part of F1 user plane protocol services (where F1 is a logical interface between a central unit gNB (gNB-CU) and distributed gNB (gNB-DU)). The average buffer size for the data radio bearer can represent an average buffer size for the concerned data radio bearer, which can be reported by gNB-DU to gNB-CU as part of a feedback process in order to control the downlink user data flow for a specific data radio bearer. The average buffer size can be averaged over time between consecutive status reports. The average buffer drain rate can be reported in a number of RLC SDUs that was taken by the MAC layer for the specific bearer between consecutive reports. By way of exemplary implementation, the average buffer size for the data radio bearer can be 4 octets of a status reporting frame (e.g., having a value range of $0 \ldots 2^{32}-1$) and the average buffer drain rate can also be 4 octets (e.g., having a value range of $0 \ldots 2^{32}-1$) in the status reporting frame.

Figure 19:
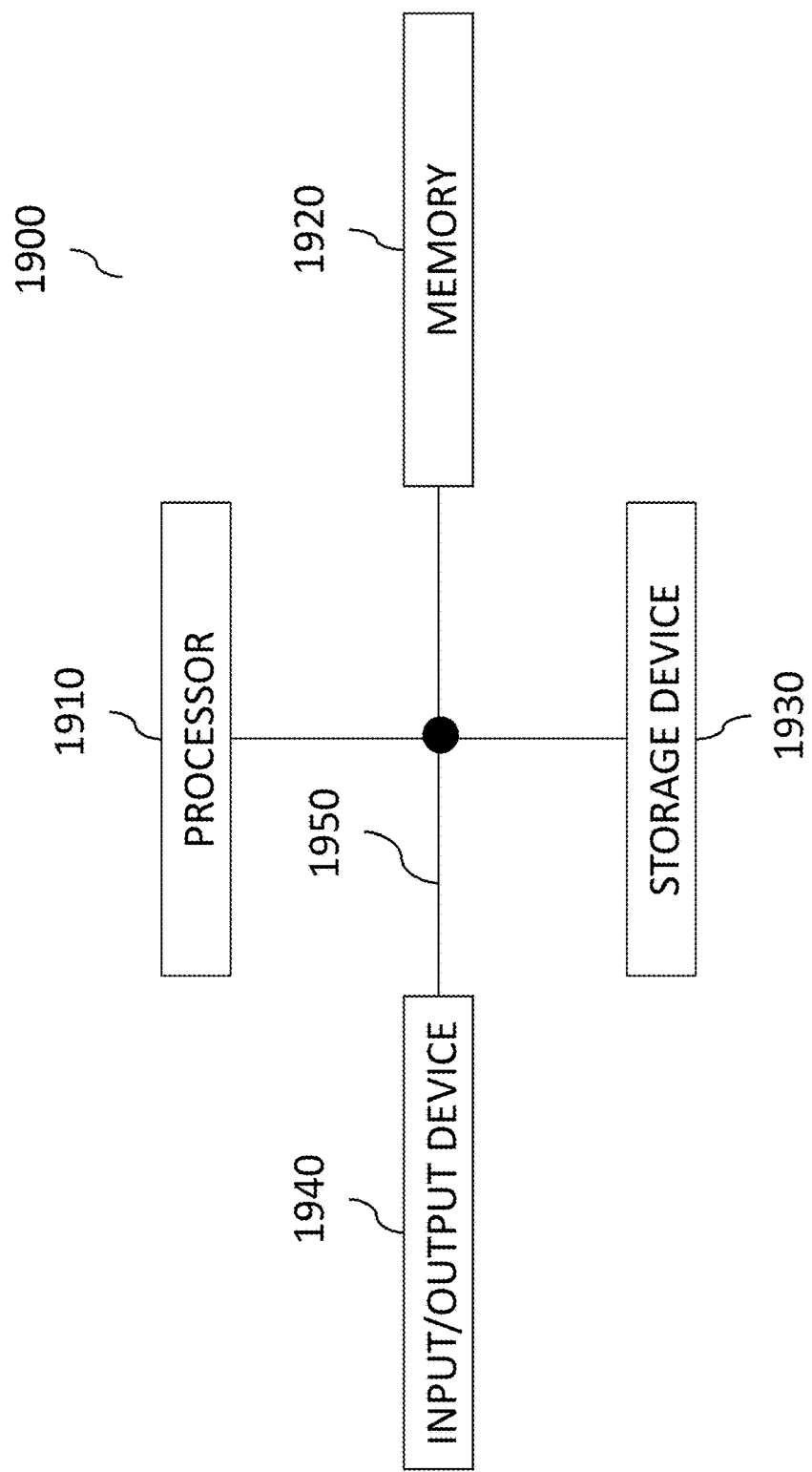
FIG. 19 illustrates an exemplary system, according to some implementations of the current subject matter.

In some implementations, the current subject matter can be configured to be implemented in a system 1900, as shown in FIG. 19. The system 1900 can include one or more of a processor 1910, a memory 1920, a storage device 1930, and an input/output device 1940. Each of the components 1910, 1920, 1930 and 1940 can be interconnected using a system bus 1950. The processor 1910 can be configured to process instructions for execution within the system 600. In some implementations, the processor 1910 can be a single-threaded processor. In alternate implementations, the processor 1910 can be a multi-threaded processor. The processor 1910 can be further configured to process instructions stored in the memory 1920 or on the storage device 1930, including receiving or sending information through the input/output device 1940. The memory 1920 can store information within the system 1900. In some implementations, the memory 1920 can be a computer-readable medium. In alternate implementations, the memory 1920 can be a volatile memory unit. In yet some implementations, the memory 1920 can be a non-volatile memory unit. The storage device 1930 can be capable of providing mass storage for the system 1900. In some implementations, the storage device 1930 can be a computer-readable medium. In alternate implementations, the storage device 1930 can be a floppy disk device, a hard disk device, an optical disk device, a tape device, non-volatile solid state memory, or any other type of storage device. The input/output device 1940 can be configured to provide input/output operations for the system 1900. In some implementations, the input/output device 1940 can include a keyboard and/or pointing device. In alternate implementations, the input/output device 1940 can include a display unit for displaying graphical user interfaces.

Figure 20:
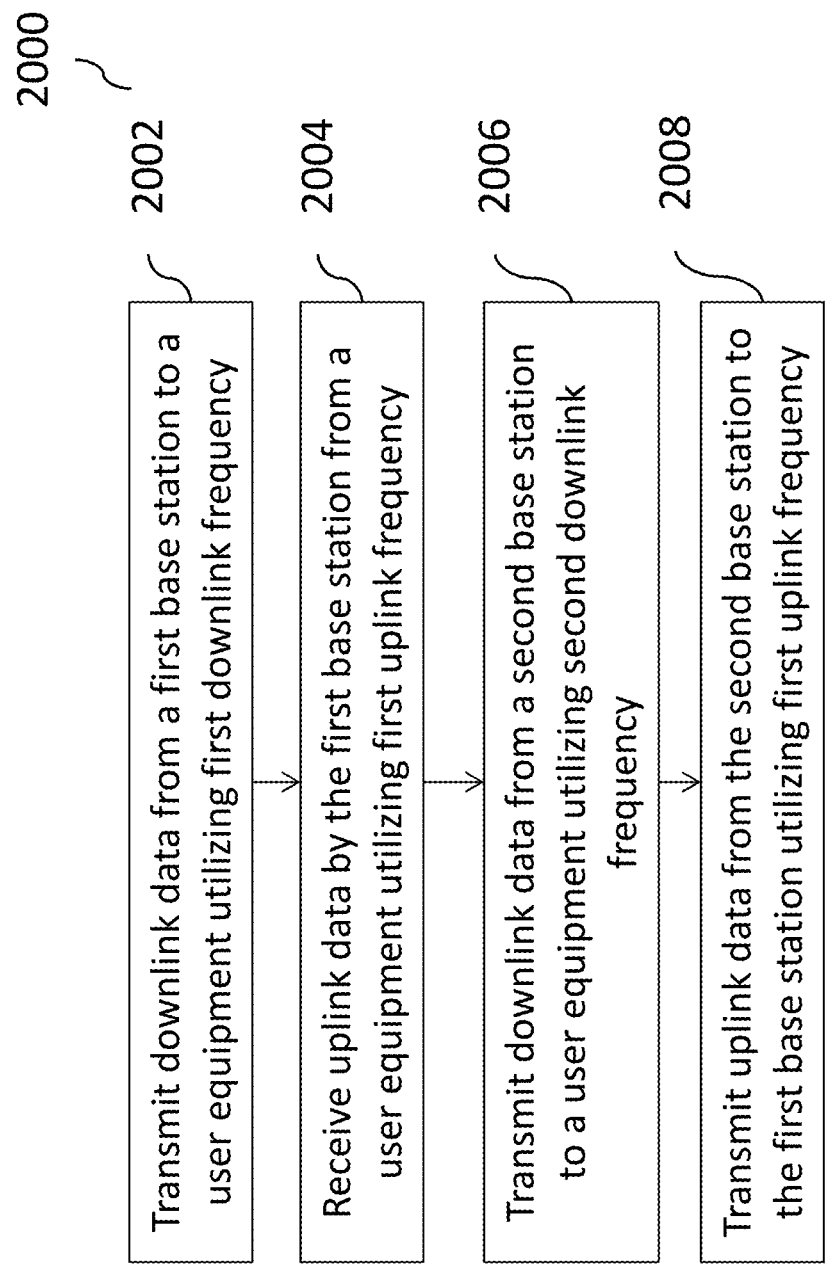
FIG. 20 illustrates an exemplary method, according to some implementations of the current subject matter.

FIG. 20 illustrates an exemplary method 2000, according to some implementations of the current subject matter. At 2002, a first base station (e.g., LTE eNodeB) can transmit downlink data to a user equipment. The transmission can utilize a first downlink frequency. At 2004, the first base station can receive uplink data from the user equipment utilizing a first uplink frequency. At 2006, a second base station (e.g., NR gNodeB) can transmit downlink data to the user equipment. This transmission can utilize a second downlink frequency. At 2008, the second base station can transmit uplink data to the first base station using the first uplink frequency.

In some implementations, the current subject matter can include one or more of the following optional features. The first downlink data can be transmitted using the first base station in a wireless communication system and the first uplink data can be received using the first base station. Similarly, the second downlink data can be transmitted from the second base station in the wireless communication system and the second uplink data can be transmitted from the second base station to the first base station.

In some implementations, the first and second base stations can include at least one of the following: an eNodeB base station, a gNodeB base station, and any combination thereof. At least one of the first base station and the second base station can include at least one of the following: a radio transmitter, a radio receiver, and any combination thereof. The first and second base stations can be base stations operating in at least one of the following communications systems: a long term evolution communications system and a new radio communications system.

In some implementations, at least one of the first and second base stations can be communicatively coupled to at least one centralized unit configured to provide at least Packet Data Convergence Protocol control information to at least one of the first base station and the second base station. At least one of the first and second uplink data can include user control information.

In some implementations, the method 2000 can include generating, using the centralized unit, a Packet Data Convergence Protocol packet data unit based on the information provided by at least one of the first and second base stations, and transmitting the generated packet data unit to at least one of the first and second base stations. The method can also include independently generating scheduling information by the first and second base stations, and sharing the generated scheduling information among the first and second base stations.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
    transmitting a first downlink data to a user equipment using a first downlink frequency;
    receiving a first uplink data from the user equipment utilizing a first uplink frequency;
    transmitting a second downlink data to the user equipment using a second downlink frequency; and
    receiving a second uplink data using the first uplink frequency;
    wherein
        the first downlink data is transmitted using a first base station in a wireless communication system, and the first uplink data is received using the first base station;
        the second downlink data is transmitted from a second base station in the wireless communication system using the second downlink frequency, and the second uplink data is transmitted from the second base station to the first base station using the first uplink frequency;

wherein at least one of the first and second base stations are communicatively coupled to at least one centralized unit configured to provide at least Packet Data Convergence Protocol control information to the at least one of the first base station and the second base station, the at least one centralized unit is configured to include a multi-connectivity traffic shaping function.

2. The method according to claim 1, where the first and second base stations include at least one of the following: an eNodeB base station, a gNodeB base station, and any combination thereof.

3. The method according to claim 2, wherein at least one of the first base station and the second base station includes at least one of the following: a radio transmitter, a radio receiver, and any combination thereof.

4. The method according to claim 3, wherein the first and second base stations are base stations operating in at least one of the following communications systems: a long term evolution communications system and a new radio communications system.

5. The method according to claim 1, wherein at least one of the first and second uplink data includes user control information.

6. The method according to claim 5, further comprising
generating, using the centralized unit, a Packet Data Convergence Protocol packet data unit based on an information provided by at least one of the first and second base stations; and
transmitting the generated packet data unit to at least one of the first and second base stations.

7. The method according to claim 6, further comprising
independently generating scheduling information by the first and second base stations; and
sharing the generated scheduling information among the first and second base stations.

8. A system comprising:
at least one programmable processor; and
a non-transitory machine-readable medium storing instructions that, when executed by the at least one programmable processor, cause the at least one programmable processor to perform operations comprising:
transmitting a first downlink data to a user equipment using a first downlink frequency;
receiving a first uplink data from the user equipment utilizing a first uplink frequency;
transmitting a second downlink data to the user equipment using a second downlink frequency; and
receiving a second uplink data using the first uplink frequency;
wherein
the first downlink data is transmitted using a first base station in a wireless communication system, and the first uplink data is received using the first base station;
the second downlink data is transmitted from a second base station in the wireless communication system using the second downlink frequency, and the second uplink data is transmitted from the second base station to the first base station using the first uplink frequency;
wherein at least one of the first and second base stations are communicatively coupled to at least one centralized unit configured to provide at least Packet Data Convergence Protocol control information to the at least one of the first base station and the second base station, the at least one centralized unit is configured to include a multi-connectivity traffic shaping function.

9. The system according to claim 8, wherein the first and second base stations include at least one of the following: an eNodeB base station, a gNodeB base station, and any combination thereof.

10. The system according to claim 9, wherein at least one of the first base station and the second base station includes at least one of the following: a radio transmitter, a radio receiver, and any combination thereof.

11. The system according to claim 10, wherein the first and second base stations are base stations operating in at least one of the following communications systems: a long term evolution communications system and a new radio communications system.

12. The system according to claim 8, wherein at least one of the first and second uplink data includes user control information.

13. The system according to claim 12, wherein the operations further comprise
generating, using the centralized unit, a Packet Data Convergence Protocol packet data unit based on an information provided by at least one of the first and second base stations; and
transmitting the generated packet data unit to at least one of the first and second base stations.

14. The system according to claim 13, wherein the operations further comprise
independently generating scheduling information by the first and second base stations; and
sharing the generated scheduling information among the first and second base stations.

15. A computer program product comprising a non-transitory machine-readable medium storing instructions that, when executed by at least one programmable processor, cause the at least one programmable processor to perform operations comprising:
transmitting a first downlink data to a user equipment using a first downlink frequency;
receiving a first uplink data from the user equipment utilizing a first uplink frequency;
transmitting a second downlink data to the user equipment using a second downlink frequency; and
receiving a second uplink data using the first uplink frequency;
wherein
the first downlink data is transmitted using a first base station in a wireless communication system, and the first uplink data is received using the first base station;
the second downlink data is transmitted from a second base station in the wireless communication system using the second downlink frequency, and the second uplink data is transmitted from the second base station to the first base station using the first uplink frequency;
wherein at least one of the first and second base stations are communicatively coupled to at least one centralized unit configured to provide at least Packet Data Convergence Protocol control information to the at least one of the first base station and the second base station, the at least one centralized unit is configured to include a multi-connectivity traffic shaping function.

16. The computer program product according to claim 15, wherein the first and second base stations include at least one of the following: an eNodeB base station, a gNodeB base station, and any combination thereof.

17. The computer program product according to claim 16, wherein at least one of the first base station and the second base station includes at least one of the following: a radio transmitter, a radio receiver, and any combination thereof.

18. The computer program product according to claim 17, wherein the first and second base stations are base stations operating in at least one of the following communications systems: a long term evolution communications system and a new radio communications system.

19. The computer program product according to claim 15, wherein at least one of the first and second uplink data includes user control information.

20. The computer program product according to claim 19, wherein the operations further comprise
- generating, using the centralized unit, a Packet Data Convergence Protocol packet data unit based on an information provided by at least one of the first and second base stations; and
- transmitting the generated packet data unit to at least one of the first and second base stations.

21. The computer program product according to claim 20, wherein the operations further comprise
- independently generating scheduling information by the first and second base stations; and
- sharing the generated scheduling information among the first and second base stations.

\* \* \* \* \*